United States Patent [19]
Ashiba

[11] Patent Number: 5,248,014
[45] Date of Patent: Sep. 28, 1993

[54] HYDRAULIC SHOCK ABSORBER

[75] Inventor: Masahiro Ashiba, Kanagawa, Japan

[73] Assignee: Tokico Ltd., Kanagawa, Japan

[21] Appl. No.: 779,503

[22] Filed: Oct. 18, 1991

[30] Foreign Application Priority Data

| Oct. 19, 1990 | [JP] | Japan | 2-281562 |
| Oct. 19, 1990 | [JP] | Japan | 2-281564 |
| Oct. 22, 1990 | [JP] | Japan | 2-283852 |

[51] Int. Cl.⁵ .............................................. F16F 9/50
[52] U.S. Cl. .................................. 188/282; 188/319; 188/322.15
[58] Field of Search ............... 188/280, 281, 282, 288, 188/319, 322.15, 299

[56] References Cited

U.S. PATENT DOCUMENTS

| 4,453,638 | 6/1984 | Wallace | 188/282 |
| 4,795,008 | 1/1989 | Joseph et al. | 188/280 |
| 5,044,474 | 9/1991 | de Kock | 188/322.15 X |
| 5,129,488 | 7/1992 | Furuya et al. | 188/282 |
| 5,129,489 | 7/1992 | Majima et al. | 188/299 |

FOREIGN PATENT DOCUMENTS

| 0275730 | 7/1988 | European Pat. Off. | |
| 42-17787 | 9/1967 | Japan . | |
| 16285 | 6/1970 | Japan | 188/280 |
| 97338 | 6/1984 | Japan | 188/282 |
| 61-109933 | 5/1986 | Japan . | |
| 62-25346 | 2/1987 | Japan . | |
| 62-71427 | 5/1987 | Japan . | |
| 3-181633 | 8/1991 | Japan . | |

Primary Examiner—Robert J. Oberleitner
Assistant Examiner—Kevin D. Rutherford
Attorney, Agent, or Firm—Wenderoth, Lind & Ponack

[57] ABSTRACT

A hydraulic shock absorber for use in a suspension system of a vehicle has the flow of a hydraulic fluid, induced in a hydraulic fluid passage providing communication between two cylinder chambers by the sliding motion of a piston in a cylinder, controlled to generate a damping force, thereby making the vehicle comfortable to ride in and improving the steering stability. The hydraulic shock absorber comprises a tubular guide communicating at both ends thereof with the two cylinder chambers, respectively. A shutter slidably fits in the tubular guide. A chamber is formed in the guide at one end of the shutter, the chamber communicating with one of the two cylinder chambers through a first orifice passage. A second orifice passage is provided in the side wall of the tubular guide, the second orifice passage being opened and closed by the sliding motion of the shutter, and a bypass passage provides communication between the two cylinder chambers through the second orifice passage.

7 Claims, 27 Drawing Sheets (a)  (b)  (c)  (d)

HYDRAULIC SHOCK ABSORBER

BACKGROUND OF THE INVENTION

1. Field of the Invention

The present invention relates to a hydraulic shock absorber for use in a suspension system of a vehicle, for example, an automobile.

2. Description of the Prior Art

A typical conventional hydraulic shock absorber has heretofore been arranged such that the flow of a hydraulic fluid that is induced in a passage providing communication between two chambers by the sliding motion of a piston in a cylinder is controlled by an orifice passage and a disk valve mechanism, thereby generating a damping force. When the piston speed is low, the shock absorber shows damping force characteristics (orifice characteristics), whereby the damping force changes along a quadratic curve in accordance with the piston speed by virtue of the throttling action of the orifice passage, and when the piston speed exceeds a predetermined level, the shock absorber shows damping force characteristics (valve characteristics) whereby the damping force changes linearly in accordance with the piston speed.

Incidentally, in order to make a vehicle more comfortable to ride in and to improve the steering stability of the vehicle, orifice and valve characteristics such as those described below are desired: When the vehicle is running in a normal state where the unsprung part of the suspension system is subject to fine vibration (i.e., high-frequency vibration), orifice and valve characteristics that provide a relatively small damping force are desired, whereas, when the vehicle is making a turn or being braked, that is, when the unsprung part of the suspension system is subject to relatively slow and large vibration (i.e., low-frequency vibration), orifice and valve characteristics that provide a relatively large damping force are desired.

Under these circumstances, for example, Japanese Patent Post-Exam. Publication No. 42-17787 (1967) discloses a hydraulic shock absorber wherein the valve characteristics change in accordance with the frequency of vibration under the spring of the suspension system. In this hydraulic shock absorber, when the frequency of vibration is low, the injection valve opening pressure of a disk valve is raised to generate a large damping force, whereas, when the frequency of vibration is high, the injection valve opening pressure of the disk valve is lowered to reduce the damping force, thereby making the vehicle even more comfortable to ride in and improving the steering stability.

Japanese Utility Model Public Disclosure (KOKAI) No. 62-25346 (1987) discloses a hydraulic shock absorber wherein the orifice characteristics at the extension side change in accordance with the frequency of vibration under the spring of the suspension system. In this hydraulic shock absorber, when the frequency of vibration is low, the passage area of the orifice is reduced to generate a large damping force, whereas, when the frequency of vibration is high, the orifice passage area is increased to reduce the damping force, thereby making the vehicle even more comfortable to ride in and improving the steering stability.

SUMMARY OF THE INVENTION

The present invention provides a hydraulic shock absorber in which the flow of a hydraulic fluid that is induced in a hydraulic fluid passage providing communication between two cylinder chambers by the sliding motion of a piston in a cylinder is controlled to generate a damping force, and comprises a tubular guide communicating at both ends thereof with the two cylinder chambers, respectively. A shutter slidably fits in the tubular guide, and a chamber is formed in the guide at one end of the shutter, the chamber communicating with one of the two cylinder chambers through a first orifice passage. A second orifice passage is provided in the side wall of the tubular guide, the second orifice passage being opened and closed by the sliding motion of the shutter, and a bypass passage provides communication between the two cylinder chambers through the second orifice passage.

In addition, the present invention provides a hydraulic shock absorber in which the flow of a hydraulic fluid that is induced in a hydraulic fluid passage providing communication between two cylinder chambers by the sliding motion of a piston in a cylinder is controlled to generate a damping force, and comprises a tubular guide communicating at both ends thereof with the two cylinder chambers, respectively. A shutter slidably fits in the tubular guide, and a chamber is formed in the guide at one end of the shutter, the chamber communicating with one of the two cylinder chambers through a first orifice passage. A passage is provided in the side wall of the tubular guide, the passage being opened and closed by the sliding motion of the shutter. A bypass passage provides communication between the two cylinder chambers through the first orifice passage, and a damping force generating mechanism, provided in the bypass passage, the mechanism comprising a second orifice passage and a damping force generating valve which cooperate with each other to control the flow of the hydraulic fluid in the bypass passage to generate a damping force.

The present invention further provides a hydraulic shock absorber comprising: a cylinder and two pistons secured to each other with a predetermined spacing, the pistons being slidably fitted in the cylinder to divide the inside of the cylinder into an upper cylinder chamber, a central cylinder chamber and a lower cylinder chamber. Communicating passages are provided in the two pistons, respectively, to provide communication between the upper, central and lower cylinder chambers. Damping force generating are provided on the two pistons, respectively, to control the flow of the hydraulic fluid that is induced in the communicating passages by the sliding motion of the two pistons to generate damping force. A piston rod extends through the two pistons, the piston rod being formed with a fitting bore that communicates with the upper and lower cylinder chambers. A shutter is slidably fitted in the fitting bore. A pressure chamber is formed in the fitting bore at one end of the shutter, the pressure chamber communicating with either the upper or lower cylinder chamber through an orifice passage. A passage is provided in the side wall of the fitting bore, the passage being opened and closed by the sliding motion of the shutter, and a bypass passage provides communication between the central cylinder chamber and either the lower or upper cylinder chamber through the passage.

The present invention further provides a hydraulic shock absorber in which the flow of a hydraulic fluid that is induced in a hydraulic fluid passage providing communication between two cylinder chambers by the sliding motion of a piston in a cylinder is controlled to generate a damping force, and comprises a tubular guide communicating at both ends thereof with the two cylinder chambers, respectively; a shutter slidably fits in the tubular guide. A pressure chamber is formed in the guide at one end of the shutter, the pressure chamber communicating with one of the two cylinder chambers through an orifice passage. A guide passage is provided in the side wall of the tubular guide. A shutter passage is provided in the shutter to provide communication between the other end side of the shutter and an intermediate portion of the outer periphery thereof, the shutter passage being communicatable with the guide passage. A bypass passage provides communication between the two cylinder chambers through the shutter passage and the guide passage, and a spring resiliently holds the shutter in a neutral position where the shutter passage and the guide passage communicate with each other.

The present invention further provides a hydraulic shock absorber comprising a cylinder having a hydraulic fluid sealed therein and two pistons secured to each other with a predetermined spacing, the pistons being slidably fitted in the cylinder to divide the inside of the cylinder into an upper cylinder chamber, a central cylinder chamber and a lower cylinder chamber. Communicating passages are provided in the two pistons, respectively, to provide communication between the upper, central and lower cylinder chambers. Damping force generating mechanisms are provided on the two pistons, respectively, to control the flow of the hydraulic fluid that is induced in the communicating passages by the sliding motion of the two pistons to generate damping force. A tubular guide communicates at both ends thereof with the upper and lower cylinder chambers, respectively. A shutter is slidably fitted in the tubular guide. A pressure chamber is formed in the guide at one end side of the shutter, the pressure chamber communicating with either the upper or lower cylinder chamber through an orifice passage. A guide passage is provided in the side wall of the tubular guide. A shutter passage is provided in the shutter to provide communication between the other end of the shutter and an intermediate portion of the outer periphery thereof, the shutter passage being communicatable with the guide passage. A bypass passage provides communication between the central cylinder chamber and either the upper or lower cylinder chamber through the shutter passage and the guide passage, and a spring resiliently holds the shutter in a neutral position where the shutter passage and the guide passage communicate with each other.

DETAILED DESCRIPTION OF THE PREFERRED EMBODIMENTS

Embodiments of the present invention will be described below in detail with reference to the accompanying drawings.

The first five embodiments described below provide hydraulic shock absorbers wherein orifice characteristics change in accordance with the frequency of vibration under the spring of the suspension system.

Figure 1:
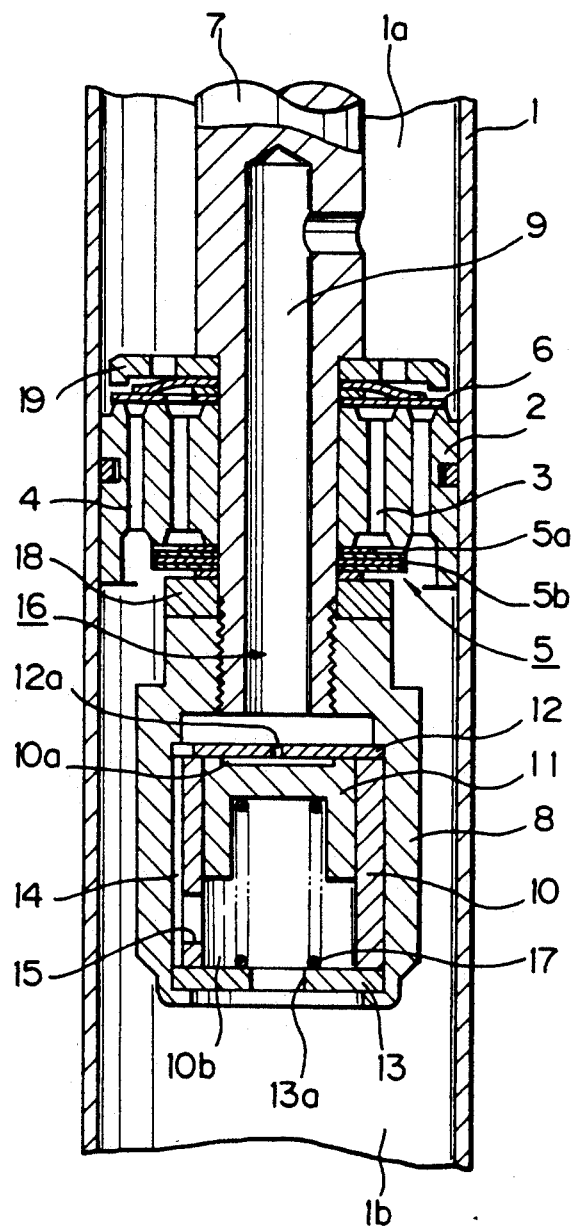
FIG. 1 is a longitudinal sectional view of an essential part of a first embodiment of the present invention.
Figure 2:
FIG. 2 shows examples of the configuration of an orifice passage in the first embodiment of the present invention.

FIG. 1 shows an essential part of a first embodiment of the present invention. Referring to FIG. 1, a cylinder 1 that has a hydraulic fluid sealed therein is slidably fitted with a piston 2, which divides the inside of the cylinder 1 into two chambers, that is, an upper cylinder chamber 1a and a lower cylinder chamber 1b. The piston 2 is provided with an extension-side hydraulic fluid passage 3 and a contraction-side hydraulic fluid passage 4, which provide communication between the upper and lower cylinder chambers 1a and 1b. The end face of the piston 2 that is closer to the lower cylinder chamber 1b is provided with a damping force generating mechanism 5 comprising an orifice passage 5a and a disk valve 5b, which cooperate with each other to generate damping force during the extension stroke. The end face of the piston 2 that is closer to the upper cylinder chamber 1a is provided with a check valve mechanism 6 that allows circulation of the hydraulic fluid through the contraction-side hydraulic fluid passage 4 during the contraction stroke.

A piston rod 7 extends through the piston 2 and has a cylindrical passage member 8 attached by thread engagement to the end portion of the piston rod 7 that extends into the lower cylinder chamber 1b. The piston rod 7 is provided with an axially extending hydraulic fluid passage 9 which communicates at one end thereof with the inside of the passage member 8 in the lower cylinder chamber 1a and which opens at the other end into the upper cylinder chamber 1a to provide communication between the upper and lower cylinder chambers 1a and 1b. The passage member 8 has a tubular guide 10 fitted therein. The guide 10 is slidably fitted with a tubular shutter 11, one end of which is closed to divide the inside of the guide 10 into two chambers, that is, an upper chamber 10a and a lower chamber 10b. A pair of partition plates 12 and 13 are interposed at both ends, respectively, of the guide 10. The partition plate 12 that is closer to the hydraulic fluid passage 9 is provided with an orifice passage 12a, while the partition plate 13 that is closer to the lower cylinder chamber 1b is provided with a bore 13a. Thus, the upper chamber 10a that is defined by the shutter 11 in the tubular guide 10 communicates with the upper cylinder chamber 1a through the orifice passage 12a and the hydraulic fluid passage 9, while the lower chamber 10b communicates with the lower cylinder chamber 1b through the bore 13a.

In addition, a hydraulic fluid passage 14 that communicates with the hydraulic fluid passage 9 is defined between a groove provided in the outer surface of the tubular guide 10 and the inner peripheral surface of the passage member 8. An orifice passage 15 is provided in the side wall of the guide 10 in such a manner as to face the hydraulic fluid passage 14. Thus, the hydraulic fluid passage 9, the hydraulic fluid passage 14, the orifice passage 15, the lower chamber 10b in the tubular guide 10 and the bore 13a constitute in combination a bypass passage 16 that provides communication between the upper and lower cylinder chambers 1a and 1b. The orifice passage 15 is arranged such that, when the shutter 1 is disposed at the uppermost position (the position shown in FIG. 1), the orifice passage 15 opens, and the degree of opening of the orifice passage 15 changes in accordance with the sliding of the shutter 11 toward the lower side as viewed in the figure. The cross-sectional configuration of the orifice passage 15 is determined by taking into consideration the relationship between the amount of sliding of the shutter 11 and the opening area. Examples of the cross-sectional configuration of the orifice passage 15 which are usable in the present invention are a triangular configuration in which two sides are defined by cubic curves, an elliptic configuration, a circular configuration, and a configuration that is comprised of a set of small bores, as shown in FIGS. 2(a), 2(b), 2(c) and 2(d). Between the shutter 11 and the partition plate 13 is provided a spring 17 with a relatively weak spring force to bias the shutter 11 upwardly (toward the partition plate 12) at all times. Reference numerals 18 and 19 in the figure denote spacers.

The operation of the first embodiment arranged as described above will next be explained.

Normally, the orifice passage 15 is opened because the shutter 11 is held in the upper position by the resilient force from the spring 17. Accordingly, during the extension stroke, the hydraulic fluid in the upper cylinder chamber 1a flows into the lower cylinder chamber 1b through the bypass passage 16 as the piston 2 slides. At this time, the hydraulic fluid in the upper cylinder chamber 1a flows into the upper chamber 10a in the tubular guide 10 through the orifice passage 12a in the partition plate 12 in accordance with the frequency of vibration of the piston 2. Therefore, the shutter 11 slides toward the partition plate 13 against the resilient force from the spring 17.

When the frequency of vibration of the piston 2 is high, the amount of hydraulic fluid that flows into the upper chamber 10a through the orifice passage 12a is small and hence the amount of sliding of the shutter 11 is also small. Therefore, the orifice passage 15 is kept open, and the hydraulic fluid circulates from the upper cylinder chamber 1a to the lower cylinder chamber 1b with low resistance. Accordingly, a small damping force is generated.

When the frequency of vibration of the piston 2 lowers, the amount of hydraulic fluid that flows into the upper chamber 10a through the orifice passage 12a increases and hence the amount of sliding of the shutter 10 also increases. Accordingly, the orifice passage 15 begins to close, and the degree of opening thereof decreases in accordance with the lowering in the frequency of vibration of the piston 2, resulting in an increase in the damping force generated. When the orifice passage 15 is completely closed, the hydraulic fluid in the upper cylinder chamber 1a flows into the lower cylinder chamber 1b through the extension-side hydraulic fluid passage 3 in the piston 2, so that a large damping force is generated by the damping force generating mechanism 5.

Figure 3:
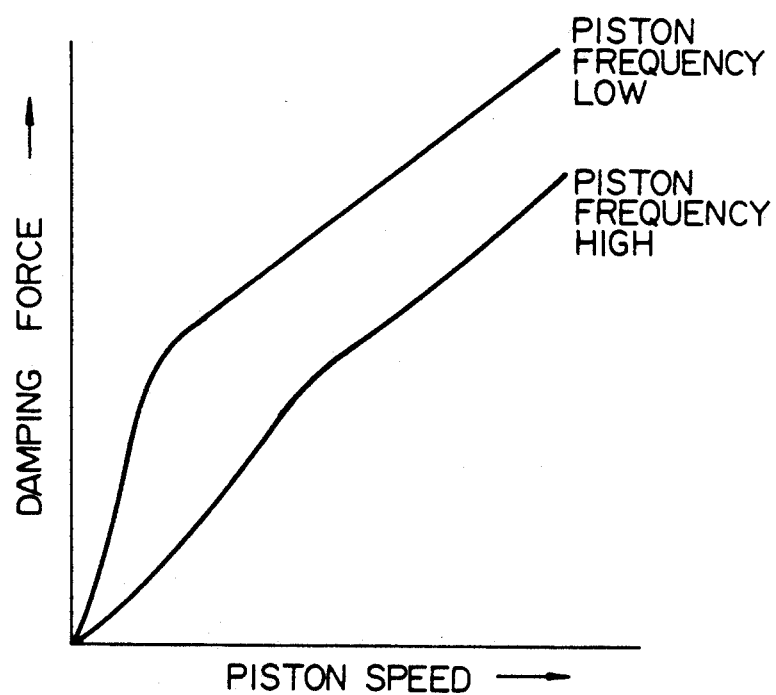
FIG. 3 is a graph showing damping force characteristics at the extension side of the apparatus shown in FIG. 1.

More specifically, during the extension stroke, when the frequency of vibration of the piston 2 is high, the degree of opening of the orifice passage 15 is kept large to provide a small orifice characteristic, and the damping force increases in accordance with the lowering in the frequency of vibration of the piston 2, as shown in the graph of FIG. 3, which shows the damping force characteristics. When the frequency of vibration of the piston 2 becomes lower than a predetermined level, the orifice passage 15 is closed and the damping force generating mechanism 5 of the piston 2 is activated to generate a large damping force.

Thus, when the vehicle is running in a normal state where the unsprung part of the suspension system is subject to fine vibration, the frequency of vibration of the piston 2 in the hydraulic shock absorber is high, so that the passage area of the orifice passage 15 is large and a small damping force is generated. As the amplitude of the vibration increases, and hence the frequency lowers, the amount of movement of shutter 11 increases, so that the passage area of the orifice passage 15 decreases. In consequence, the orifice characteristics change so as to generate a large damping force. When the vehicle is making a turn or being braked, that is, when the unsprung part of the suspension system is subject to relatively slow and large vibration, the frequency of vibration of the piston 2 in the hydraulic shock absorber is low, so that the orifice passage 15 is closed to generate a large damping force. By changing the orifice characteristics in accordance with the frequency of vibration under the spring of the suspension system in this way, it is possible to make the vehicle even more comfortable to ride in and to improve the steering stability.

During the contraction stroke, the hydraulic fluid in the lower cylinder chamber 1b is pressurized, so that the shutter 11 is pressed toward the partition plate 12 to open the orifice passage 15. Thus, the hydraulic fluid in the lower cylinder chamber 1b flows into the upper cylinder chamber 1a through the bypass passage 16 and the contraction-side hydraulic fluid passage 4 with substantially no resistance. Accordingly, substantially no damping force is generated at the piston 2 during the contraction stroke.

Figure 4:
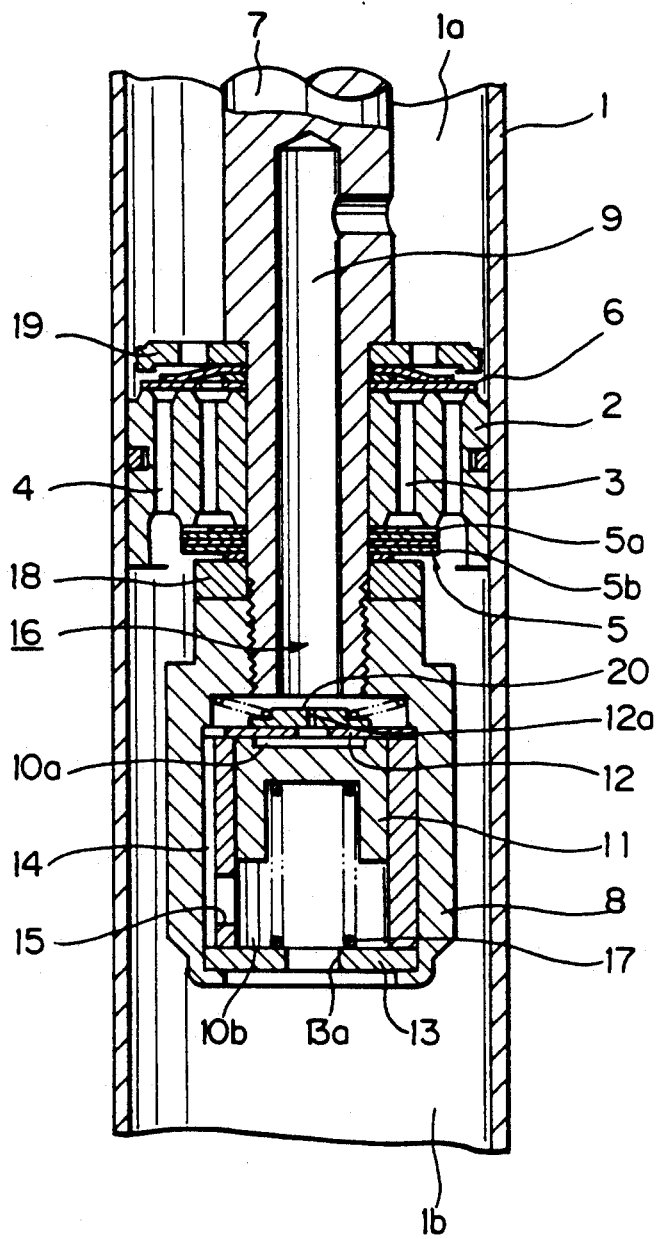
FIG. 4 is a longitudinal sectional view of an essential part of an arrangement obtained by providing the apparatus shown in FIG. 1 with a check valve mechanism for promptly moving a shutter when the stroke changes over from the extension stroke to the contraction stroke.

If the partition plate 12 is provided with a check valve mechanism 20 having the orifice passage 12a to allow circulation of the hydraulic fluid from the upper chamber 10a in the tubular guide 10 to the bypass passage 16, as shown in FIG. 4, the shutter 11 can be promptly moved toward the partition plate 12 to open the orifice passage 15 when the stroke changes over from the extension stroke to the contraction stroke.

It should be noted that in the first embodiment a base valve mechanism (not shown) that generates damping force during the contraction stroke may be provided at the bottom of the cylinder 1.

A second embodiment of the present invention will next be explained.

Figure 5:
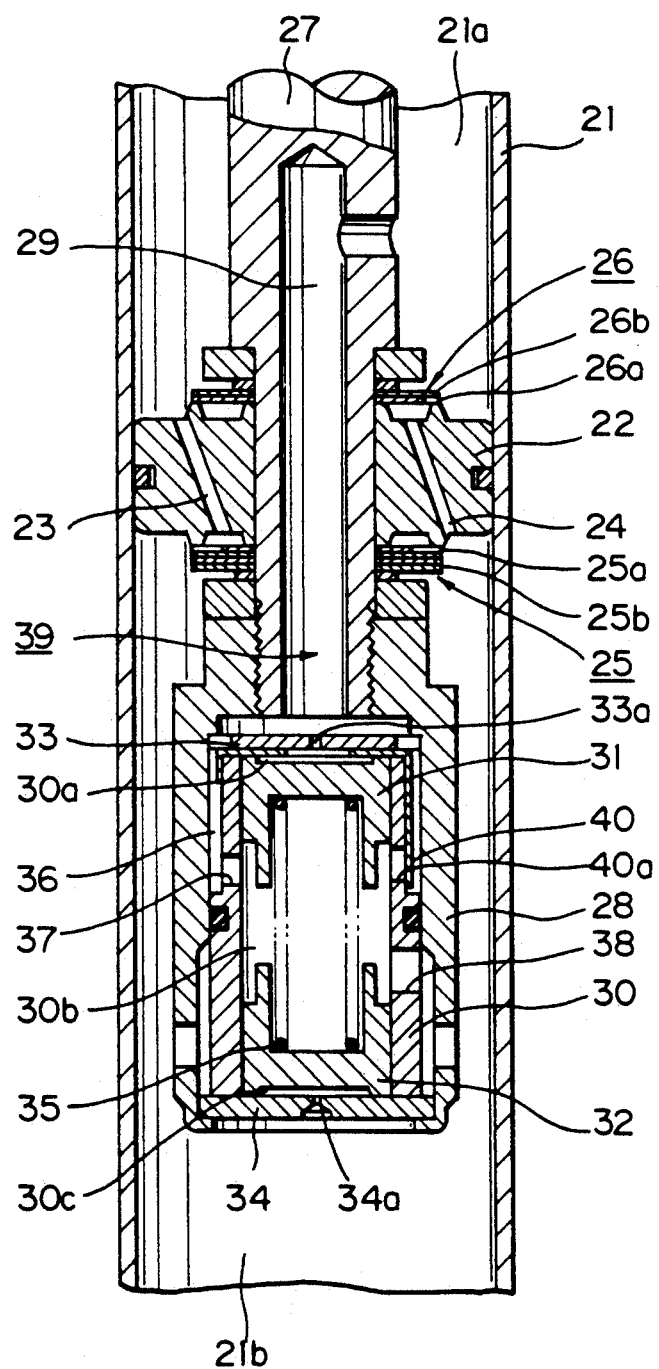
FIG. 5 is a longitudinal sectional view of an essential part of a second embodiment of the present invention.

FIG. 5 shows an essential part of a second embodiment of the present invention. Referring to FIG. 5, a cylinder 21 that has a hydraulic fluid sealed therein is slidably fitted with a piston 22, which divides the inside of the cylinder 21 into two chambers, that is, an upper cylinder chamber 21a and a lower cylinder chamber 21b. The piston 22 is provided with an extension-side hydraulic fluid passage 23 and a contraction-side hydraulic fluid passage 24, which provide communication between the upper and lower cylinder chambers 21a and 21b. The end face of the piston 22 that is closer to the lower cylinder chamber 21b is provided with a damping force generating mechanism 25 comprising an orifice passage 25a and a disk valve 25b, which cooperate with each other to generate damping force during the extension stroke. The end face of the piston 22 that is closer to the upper cylinder chamber 21a is provided with a damping force generating mechanism 26 comprising an orifice passage 26a and a disk valve 26b, which cooperate with each other to generate damping force during the contraction stroke.

A piston rod 27 extends through the piston 22 and has a cylindrical passage member 28 attached by thread engagement to the end portion of the piston rod 27 that extends into the lower cylinder chamber 21b. The piston rod 27 is provided with an axially extending hydraulic fluid passage 29 which communicates at one end thereof with the inside of the passage member 28 in the lower cylinder chamber 21b and which opens at the other end into the upper cylinder chamber 21a to provide communication between the upper and lower cylinder chambers 21a and 21b. The passage member 28 has a tubular guide 30 fitted therein. The guide 30 is slidably fitted with a pair of shutters 31 and 32 one end of each of which is closed, with the respective openings facing each other. A pair of partition plates 33 and 34 are interposed at both ends, respectively, of the tubular guide 30, the partition plates 33 and 34 having orifice passages 33a and 34a, respectively. The inside of the tubular guide 30 is divided by the two shutters 31 and 32 into three chambers, that is, a chamber 30a which is closer to the partition plate 33, a chamber 30b which is defined between the shutters 31 and 32, and a chamber 30c which is closer to the partition plate 34. Between the shutters 31 and 32 is interposed a spring 35 with a relatively weak spring force to bias the shutters 31 and 32 toward the corresponding ends of the guide 30.

The inside of the tubular guide 30 communicates at one end thereof with the upper cylinder chamber 21a through the orifice passage 33a and the hydraulic fluid passage 29 and also communicates at the other end with the lower cylinder chamber 21b through the orifice passage bore 34a. A hydraulic fluid passage 36 that communicates with the hydraulic fluid passage 29 is formed between the passage member 28 and the tubular guide 30. An orifice passage 37 that provides communication between the hydraulic fluid passage 36 and the chamber 30b is provided in the side wall of the guide 30 at a position where it can be opened and closed by the sliding motion of the shutter 31. In addition, an orifice passage 38 that provides communication between the lower cylinder chamber 21b and the chamber 30b is provided in the side wall of the guide 30 at a position where it can be opened and closed by the sliding motion of the shutter 32. Thus, the hydraulic fluid passage 29, the hydraulic fluid passage 36, the orifice passage 37, the chamber 30b and the orifice passage 38 constitute in combination a bypass passage 39 that provides communication between the upper cylinder chamber 21a and the lower cylinder chamber 21b. The tubular guide 30 is further provided with a check valve mechanism 40 having a passage 40a that allows circulation of the hydraulic fluid from the chamber 30b to the hydraulic fluid passage 36.

It should be noted that the passage area of the orifice passage 37 is smaller than that of the orifice passage 38 and the passage area of the orifice passage 38 is smaller than the sum of the passages areas of the orifice passage 37 and the passage 40a.

The operation of the second embodiment arranged as described above will next be explained.

During the extension stroke, the hydraulic fluid in the upper cylinder chamber 21a flows into the lower cylinder chamber 21b through the bypass passage 39 as the piston 22 slides, in the same way as in the first embodiment. In addition, the hydraulic fluid in the upper cylinder chamber 21a flows into the upper chamber 30a in the tubular guide 30 through the orifice passage 33a in the partition plate 33, causing the shutter 31 to move toward the partition plate 34. At this time, the shutter 32 does not move, so that the orifice passage 38 remains fully open.

When the frequency of vibration of the piston 22 is high, the amount of sliding of the shutter 31 is small and hence the orifice passage 37 remains open to allow the hydraulic fluid to circulate from the upper cylinder chamber 21a to the lower cylinder chamber 21b with substantially no resistance. Accordingly, substantially no damping force is generated.

As the frequency of vibration of the piston 22 lowers, the amount of sliding of the shutter 31 increases. Accordingly, the orifice passage 37 begins to close, and the degree of opening thereof decreases in accordance with the lowering in the frequency of vibration of the piston 22, resulting in an increase in the damping force generated. When the orifice passage 37 is completely closed, the hydraulic fluid in the upper cylinder chamber 21a flows into the lower cylinder chamber 21b through the extension-side hydraulic fluid passage 23 in the piston 22, so that a large damping force is generated by the damping force generating mechanism 25.

During the contraction stroke, the hydraulic fluid in the lower cylinder chamber 21b flows into the upper cylinder chamber 21a through the bypass passage 39 as the piston 22 slides. At this time, the hydraulic fluid in the lower cylinder chamber 21b flows into the lower chamber 30c in the tubular guide 30 through the orifice passage 34a in the partition plate 34, causing the shutter 32 to slide toward the plate 33 in the same way as during the extension stroke. At this time, the shutter 31 does not move, so that the orifice passage 37 remains fully open.

When the frequency of vibration of the piston 22 is high, the amount of sliding of the shutter 32 is small, so that the orifice passage 38 remains open to allow the hydraulic fluid to circulate from the lower cylinder chamber 21b to the upper cylinder chamber 21a with substantially no resistance. Accordingly, substantially no damping force is generated.

When the frequency of vibration of the piston 22 lowers, the amount of sliding of the shutter 32 increases, so that the orifice passage 38 begins to close, and the degree of opening of the orifice passage 38 decreases in accordance with the lowering in the frequency of vibration of the piston 22, resulting in an increase in the damping force generated. When the orifice passage 38 is closed, the hydraulic fluid in the lower cylinder chamber 21b flows into the upper cylinder chamber 21a through the contraction-side hydraulic fluid passage 24, so that a large damping force is generated by the damping force generating mechanism 26.

Figure 6:
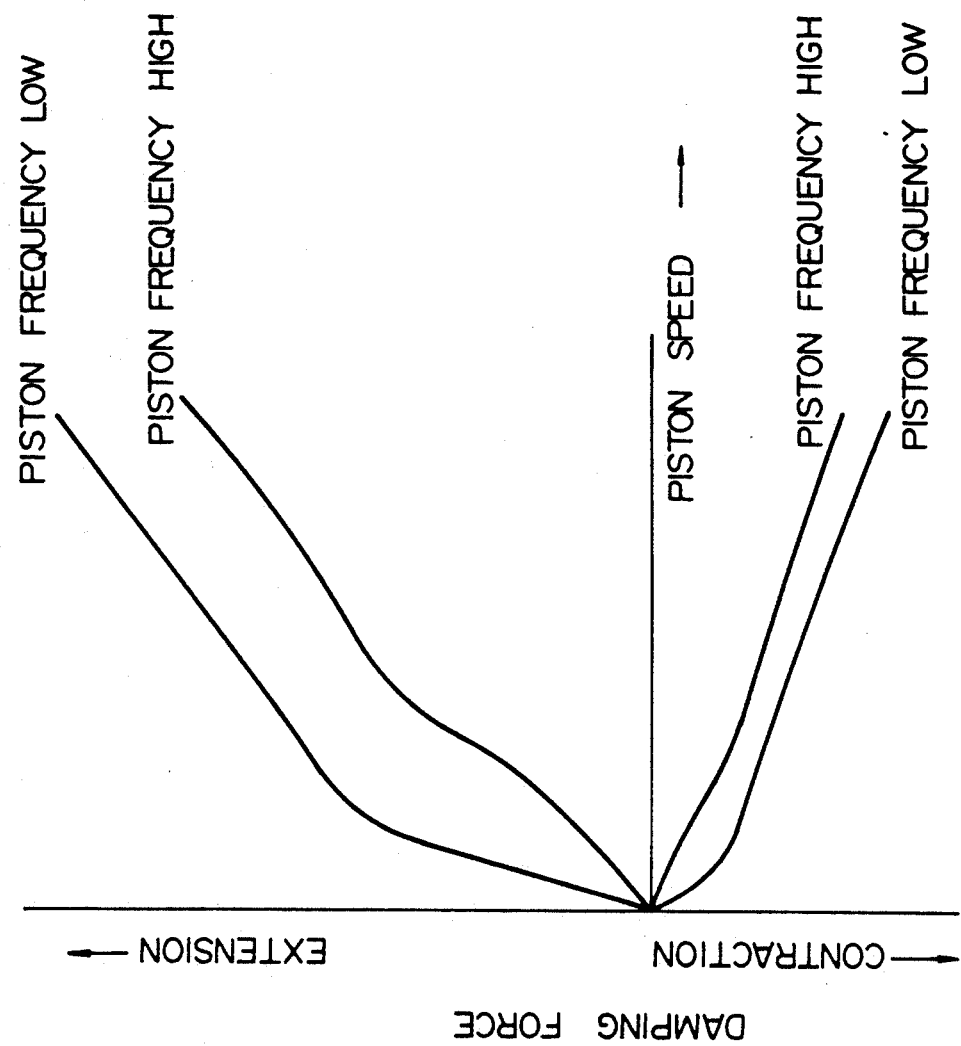
FIG. 6 is a graph showing damping force characteristics of the apparatus shown in FIG. 5.

More specifically, during both the extension and contraction strokes, when the frequency of vibration of the piston 22 is high, the degree of opening of the orifice passage 37 or 38 remains large to provide a small orifice characteristic, and the damping force increases in accordance with the lowering in the frequency of vibration of the piston 22, as shown in the graph of FIG. 6, which shows the damping force characteristics. When the frequency of vibration of the piston 22 becomes lower than a predetermined level, the orifice passage 37 or 38 is closed and the damping force generating mechanism 25 or 26 of the piston 22 is activated to produce a large damping force.

It is also possible to provide a base valve mechanism to increase the damping force during the contraction stroke in the same way as in the first embodiment. In addition, the check valve mechanism 20, shown in FIG. 4, may be provided in place of each of the orifice passages 33a and 34a in the partition plates 33 and 34.

A third embodiment of the present invention will next be explained.

Since the third embodiment is different from the first embodiment only in that a damping force generating mechanism is provided in the bypass passage, the same or corresponding members in these two embodiments are denoted by the same reference numerals, and detailed description will be made only of a portion of the third embodiment that is different from the first embodiment.

Figure 7:
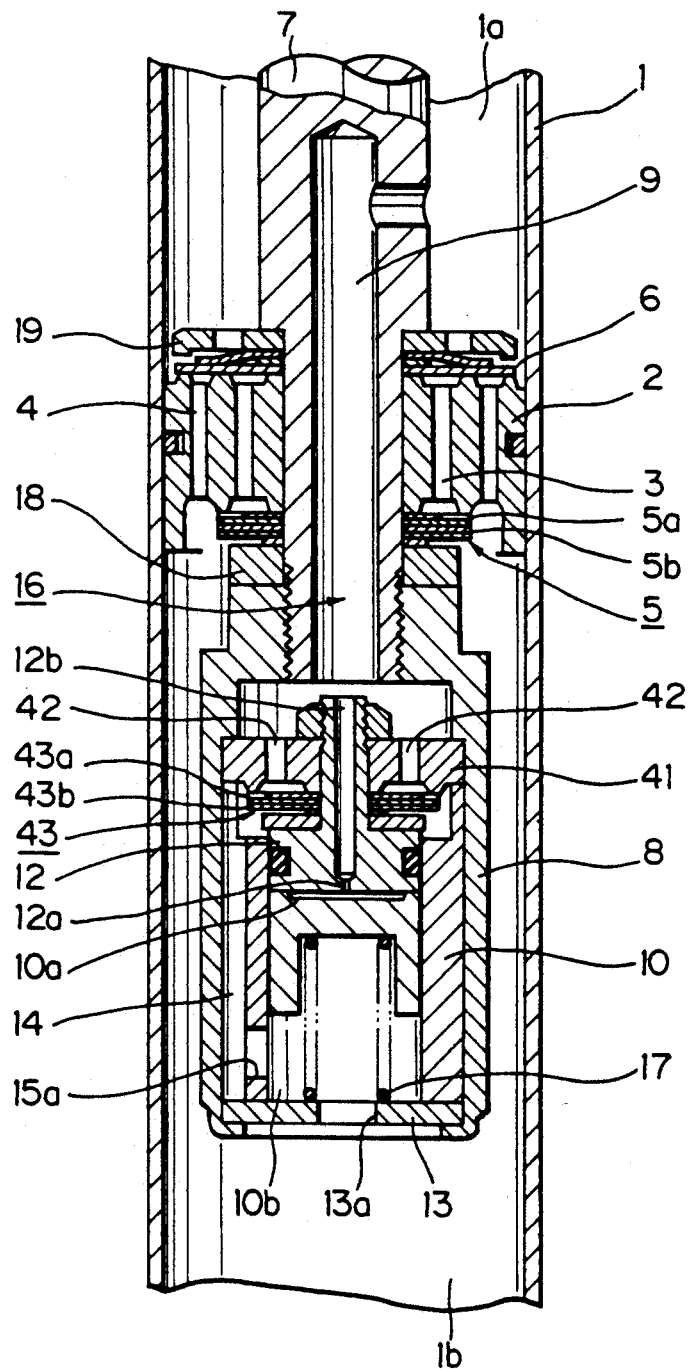
FIG. 7 is a longitudinal sectional view of an essential part of a third embodiment of the present invention.

Referring to FIG. 7, the tubular guide 10 in the passage member 8 is fitted with a partition member 41 at the end thereof which is closer to the hydraulic fluid passage 9 to stop the bypass passage 16. The partition member 41 is provided with a bypass hydraulic fluid passage 42 that allows circulation of the hydraulic fluid through the bypass passage 16. The end face of the partition member 41 which is closer to the guide 10 is provided with a damping force generating mechanism 43 that comprises an orifice passage 43a and a disk valve 43b, which cooperate with each other to control the flow of the hydraulic fluid in the bypass hydraulic fluid passage 42 so as to generate a damping force during the extension stroke. The damping force generating mechanism 43 has relatively low flow resistance and generates a relatively small damping force in comparison to the damping force generating mechanism 5 of the piston 2. The partition plate 12, which is provided at the end of the tubular guide 10 which is closer to the partition member 41, has a passage portion 12b extending toward the hydraulic fluid passage 9, the passage portion 12b communicating with the orifice passage 12a. The passage portion 12b extends through the partition member 41 to open into the hydraulic fluid passage 9.

It should be noted that the guide 10 is provided with a passage 15a with a relatively large passage area in place of the orifice passage 15 in the first embodiment.

The operation of the third embodiment arranged as described above will next be explained.

During the extension stroke, the hydraulic fluid in the upper cylinder chamber 1a flows into the lower cylinder chamber 1b through the bypass passage 16 as the piston 2 slides, in the same way as in the first embodiment. At this time, the hydraulic fluid in the upper cylinder chamber 1a flows into the upper chamber 10a in the tubular guide 10 through the passage portion 12b and the orifice passage 12a in the partition plate 12, causing the shutter 11 to slide toward the partition plate 13.

When the frequency of vibration of the piston 2 is high, the amount of sliding of the shutter 11 is small, so that the passage 15a remains open and the hydraulic fluid in the upper cylinder chamber 1a flows into the lower cylinder chamber 1b through the bypass passage 16. Accordingly, the hydraulic fluid circulates through the bypass hydraulic fluid passage 42, causing a small damping force to be generated by the cooperation of the orifice passage 43a and the disk valve 43b of the damping force generating mechanism 43.

When the frequency of vibration of the piston 2 lowers, the amount of sliding of the shutter 10 increases. Therefore, when the movement of the piston 2 exceeds a predetermined level, the passage 15a begins to close, and the degree of opening thereof decreases in accordance with the lowering in the frequency of vibration of the piston 2, resulting in an increase in the damping force generated. Accordingly, the rate of flow through the bypass passage 16 decreases, whereas the rate of flow through the extension-side hydraulic fluid passage 3 in the piston 2 increases in inverse proportion thereto, resulting in an increase in the damping force generated by the damping force generating mechanism 5. When the passage 15a is closed, the hydraulic fluid circulates through the extension-side hydraulic fluid passage 3 only, so that a large damping force is generated by the damping force generating mechanism 5.

Figure 8:
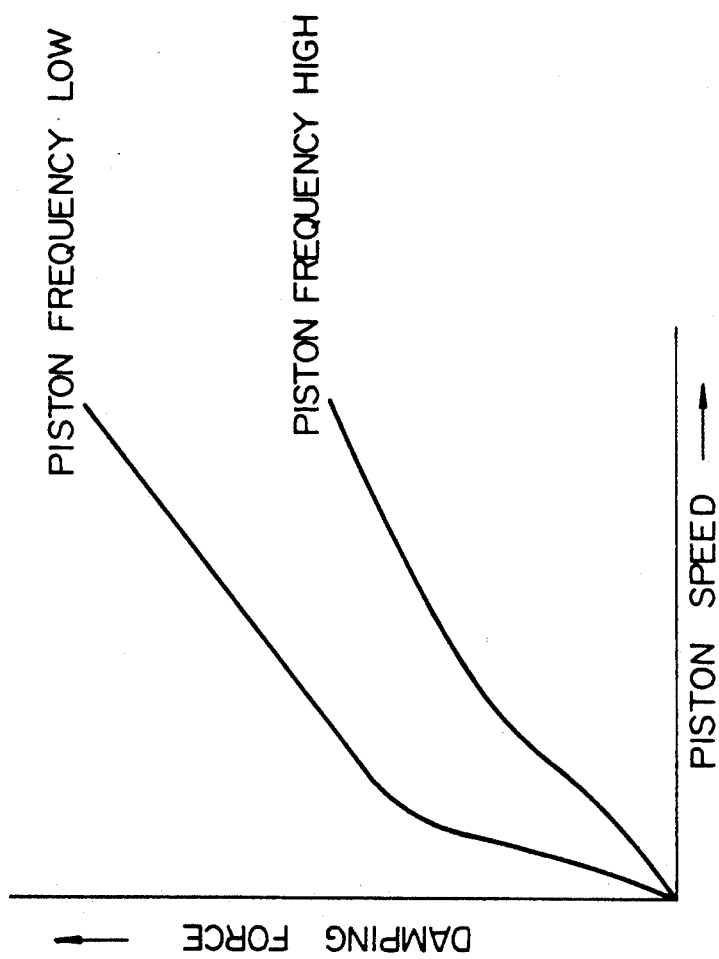
FIG. 8 is a graph showing damping force characteristics at the extension side of the apparatus shown in FIG. 7.

More specifically, when the frequency of vibration of the piston 2 is high, a small damping force is generated by the orifice 43a and the disk valve 43b of the damping force generating mechanism 43 provided in the bypass passage 16, and as the frequency of vibration of the piston 2 decreases, the rate of flow through the bypass passage 16 is reduced to increase the rate of flow through the extension-side hydraulic fluid passage 3 in inverse proportion to the reduction in the flow rate in the bypass passage 16, thereby increasing the damping force, as shown in the graph of FIG. 8, which shows the orifice and valve characteristics in this embodiment. When the frequency of vibration of the piston 2 becomes lower than a predetermined level, the orifice passage 15a is closed and the orifice passage 5a and the disk valve 5b in the damping force generating mechanism 5 provided on the piston 2 are activated to generate a large damping force.

During the contraction stroke, the check valve mechanism 6 provided on the piston 2 is opened, so that substantially no damping force is generated at the piston 2.

A fourth embodiment of the present invention will next be explained.

Since the fourth embodiment is different from the second embodiment only in that a damping force generating mechanism is provided in the bypass passage, the same or corresponding members in these two embodiments are denoted by the same reference numerals, and detailed description will be made only on a portion of the fourth embodiment that is different from the second embodiment.

Figure 9:
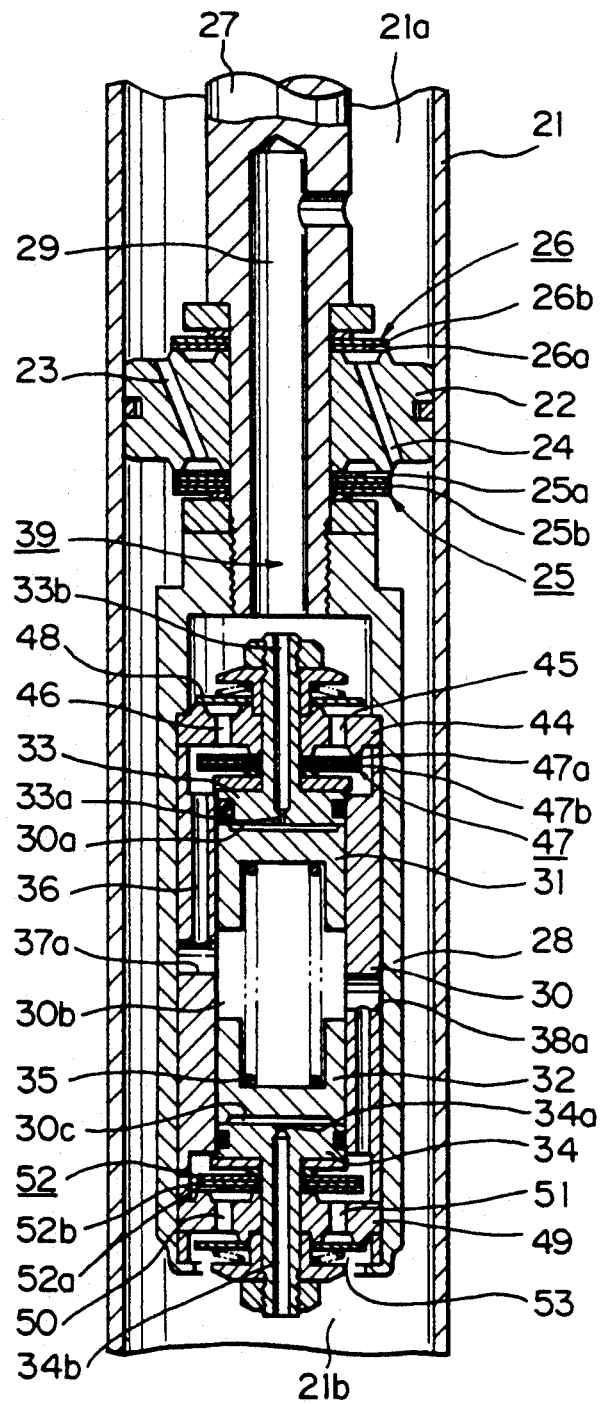
FIG. 9 is a longitudinal sectional view of an essential part of a fourth embodiment of the present invention.

Referring to FIG. 9, the tubular guide 30 in the passage member 28 is fitted with a partition member 44 at the end thereof which is closer to the hydraulic fluid passage 29 to stop the bypass passage 39. The partition member 44 is provided with an extension-side bypass hydraulic fluid passage 45 and a contraction-side bypass hydraulic fluid passage 46, which allow circulation of the hydraulic fluid through the bypass passage 39. The end face of the partition member 44 which is closer to the guide 30 is provided with an extension-side damping force generating mechanism 47 that comprises an orifice passage 47a and a disk valve 47b, which cooperate with each other to control the flow of the hydraulic fluid through the extension-side bypass hydraulic fluid passage 45 so as to generate a damping force during the extension stroke. The extension-side damping force generating mechanism 47 has a relatively low flow resistance and generates a relatively small damping force in comparison to the damping force generating mechanism 25 of the piston 22. The end face of the partition plate 44 which is closer to the hydraulic fluid passage 29 is provided with a check valve 48 that allows circulation of the hydraulic fluid through the contraction-side bypass hydraulic fluid passage 46 during the contraction stroke. The partition plate 33, which is provided at the end of the tubular guide 30 which is closer to the partition member 44, has a passage portion 33b extending toward the hydraulic fluid passage 29, the passage portion 33b communicating with the orifice passage 33a. The passage portion 33b extends through the partition member 44 to open into the hydraulic fluid passage 29.

In addition, a partition member 49 is provided to stop a passage that connects together the orifice passage 38a in the tubular guide 30 and the lower cylinder chamber 21b. The partition member 49 is provided with an extension-side hydraulic fluid passage 51 and a contraction-side hydraulic fluid passage 50, which allow circulation of the hydraulic fluid through this passage. The end face of the partition member 49 which is closer to the orifice passage 38a is provided with a contraction-side damping force generating mechanism 52 that comprises an orifice passage 52a and a disk valve 52b, which cooperate with each other to control the flow of the hydraulic fluid through the contraction-side hydraulic fluid passage 50 so as to generate damping force during the contraction stroke. The contraction-side damping force generating mechanism 52 has a relatively low flow resistance and generates a relatively small damping force in comparison to the damping force generating mechanism 26 of the piston 22. The end face of the partition plate 49 which is closer to the lower cylinder chamber 21b is provided with a check valve 53 that allows circulation of the hydraulic fluid through the extension-side hydraulic fluid passage 51 during the extension stroke. The partition plate 34, which is provided at the end of the tubular guide 30 which is closer to the partition member 49, has a passage portion 34b extending toward the lower cylinder chamber 21b, the passage portion 34b communicating with the orifice passage 34a. The passage portion 34b extends through the partition member 49 to open into the lower cylinder chamber 21b.

In the fourth embodiment, the hydraulic fluid passage 36 that constitutes the bypass passage 39 is provided in the side wall of the guide 30. The guide 30 is provided with passages 37a 38a, which have a relatively large passage area, in place of the orifice passages 37 and 38. In addition, the check valve mechanism 40 that is provided in the second embodiment is omitted in this embodiment. The operation of the fourth embodiment arranged as described above will next be explained.

The operation during the extension stroke will first be explained. When the frequency of vibration of the piston 22 is high, a small damping force is generated by the orifice 47a and the disk valve 47b in the damping force generating mechanism 47 provided on the partition member 44 in the bypass passage 39, in the same way as in the third embodiment. When the frequency of vibration of the piston 22 lowers, the rate of flow through the bypass passage 39 is reduced in accordance with the lowering in the frequency of vibration of the piston 22, whereas the rate of flow through the extension-side hydraulic fluid passage 23 in the piston 22 is increased in inverse proportion thereto, thus causing an increase in the damping force generated. When the frequency of vibration of the piston 22 becomes lower than a predetermined level, the passage 37a is closed and the orifice passage 25a and the disk valve 25b in the damping force generating mechanism 25 provided on the piston 22 are activated to generate a large damping force. At this time, the shutter 32 does not move, so that the passage 38a remains fully open. Accordingly, the hydraulic fluid passing through the passage 38a circulates through the extension-side hydraulic fluid passage 51 in the partition member 49 and pushes the check valve 53 open to flow into the lower cylinder chamber 21b.

During the contraction stroke, damping force characteristics which are similar to those during the extension stroke are obtained by the contraction-side damping force generating mechanism 52 on the partition member 49 and the damping force generating mechanism 26 on the piston 22 in accordance with the sliding motion of the shutter 32, although the direction of circulation of the hydraulic fluid is reverse from that during the extension stroke. More specifically, when the frequency of vibration of the piston 22 is high, a small damping force is generated by the orifice 52a and the disk valve 52b in the damping force generating mechanism 52 provided on the partition member 49 in the bypass passage 39. When the frequency of vibration of the piston 22 lowers, the rate of flow through the bypass passage 39 is reduced in accordance with the lowering in the frequency of vibration of the piston 22, whereas the rate of flow through the contraction-side hydraulic fluid passage 24 in the piston 22 is increased in inverse proportion thereto, thus causing an increase in the damping force generated. When the frequency of vibration of the piston 22 becomes lower than a predetermined level, the passage 38a is closed and the orifice passage 26a and the disk valve 26b in the damping force generating mechanism 26 provided on the piston 22 are activated to generate a large damping force. At this time, the shutter 31 does not move, so that the passage 37a remains fully open. Accordingly, the hydraulic fluid passing through the passage 37a circulates through the contraction-side hydraulic fluid passage 46 in the partition member 44 and pushes the check valve 48 open to flow into the upper cylinder chamber 21a.

Figure 10:
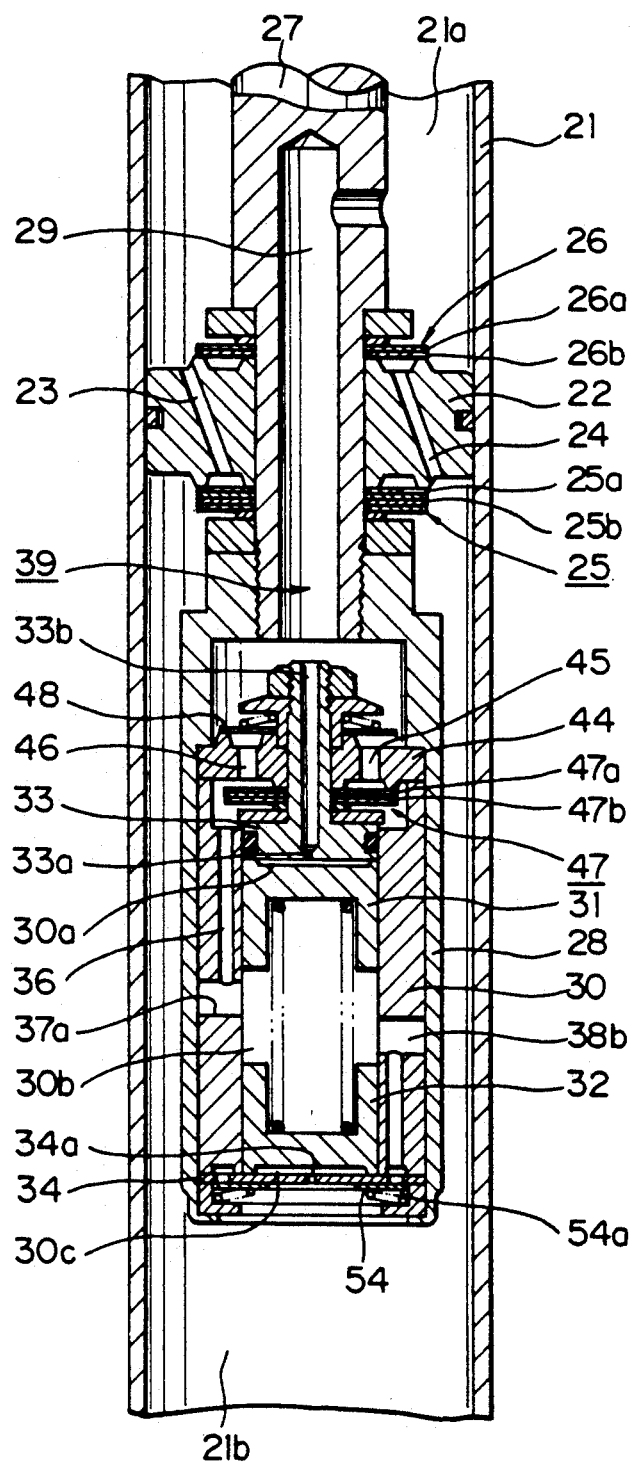
FIG. 10 is a longitudinal sectional view of an essential part of the apparatus shown in FIG. 9, in which a damping force generating mechanism for the contraction side provided in a bypass passage in FIG. 9 is omitted.

In the fourth embodiment, the partition member 49 may be replaced with a pressure control valve 54 having an orifice passage 54a, provided in a passage connecting together the passage 38a and the lower cylinder chamber 21b, which is opened to provide no extra resistance during the extension stroke and which is closed to narrow down the passage area during the contraction stroke, as shown in FIG. 10. In this case, it is necessary to make the passage area of the orifice passage 54a in the pressure control valve 54 larger than that of the orifice passage 47a in the extension-side damping force generating mechanism 47 in order to make the pressure inside the chamber 30b in the tubular guide 30 lower than the pressure inside the chamber 30a or the chamber 30c. In addition, a base valve mechanism (not shown) that generates a damping force during the contraction stroke is provided at the bottom of the cylinder 21, and a reservoir chamber (not shown) that communicates with the lower cylinder chamber 21b through the base valve mechanism is provided at the outer periphery of the cylinder 21.

With this arrangement, during the extension stroke the same function as that of the arrangement shown in FIG. 9 is obtained. During the contraction stroke, when the frequency of vibration of the piston 22 is high, the passage 38a is opened, so that a small damping force is generated by the base valve mechanism (not shown), whereas, when the frequency of vibration of the piston 22 is low, the degree of opening of the passage 38a decreases, so that the damping force increases in inverse proportion to the reduction in the opening of the passage 38a. When the passage 38a is closed, a large damping force is obtained by the damping force generating mechanism 26 on the piston 22 and the base valve mechanism.

Figure 11:
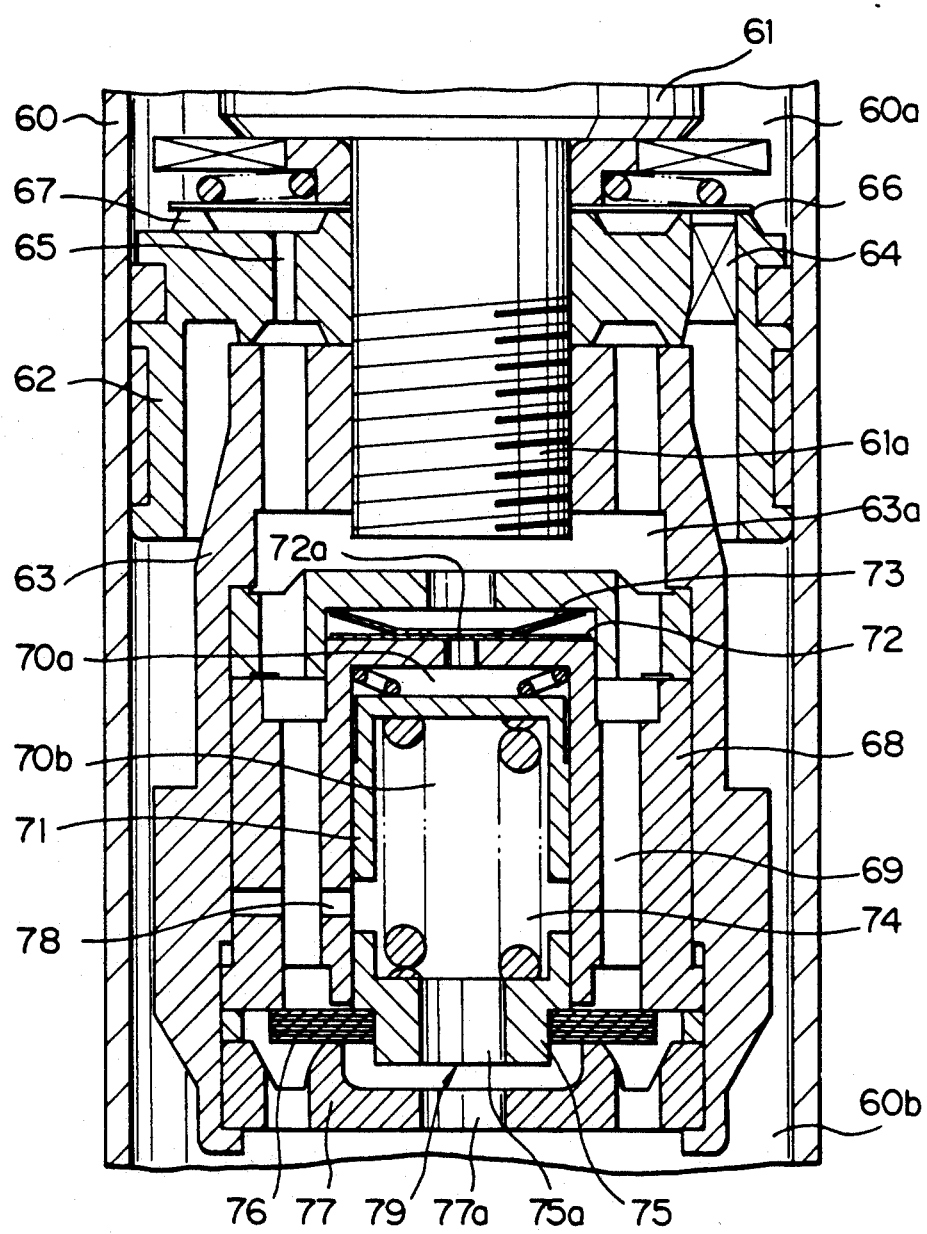
FIG. 11 is a longitudinal sectional view of an essential part of a fifth embodiment of the present invention.

A fifth embodiment of the present invention will next be explained with reference to FIG. 11, which shows an essential part thereof.

A cylinder 60 has a hydraulic fluid sealed therein, and it has a piston rod 61 inserted therein. The end of the piston rod 61 that is inside the cylinder 60 is formed with a small-diameter portion 61a. The small-diameter portion 61a has a piston 62 fitted thereon, which divides the inside of the cylinder 60 into two chambers, that is, an upper cylinder chamber 60a and a lower cylinder chamber 60b. The piston 62 is secured by a cylindrical passage member 63.

The piston 62 is provided with a contraction-side hydraulic fluid passage 64 and a hydraulic fluid passage 65 which serves as both an extension- and contraction-side hydraulic fluid passage, the passages 64 and 65 providing communication between the upper and lower cylinder chambers 60a and 60b. The end of the piston 62 which is closer to the upper cylinder chamber 60a is provided with a check valve mechanism 66 that allows the flow of the hydraulic fluid through the hydraulic fluid passage 64 during the contraction stroke. The end face of the piston 62 which is closer to the upper cylinder chamber 60a is formed with a passage 67 that always provides communication between the upper cylinder chamber 60a and the hydraulic fluid passage 65.

The cylindrical passage member 63 has a tubular guide 68 fitted therein. The side wall of the guide 68 is provided with a hydraulic fluid passage 69 that provides communication between the hydraulic fluid passage 65 and the lower cylinder chamber 60b. A chamber 63a is formed inside the passage member 63 and above the guide member 68.

The tubular guide member 68 is slidably fitted with a shutter 71, one end of which is closed. The shutter 71 divides the inside of the guide member 68 into two chambers, that is, an upper chamber 70a and a lower chamber 70b. The upper end of the guide member 68 is provided with a valve plate 72 that constitutes a check valve mechanism. The valve plate 72 is provided with an orifice passage 72a that provides communication between the chamber 63a inside the passage member 63 and the upper chamber 70a. In addition, the valve plate 72 is pressed against the upper end of the guide member 68 by a spider-shaped spring member 73 with several leg portions.

The shutter 71 is biased toward the upper end of the guide member 68 by a spring 74. A tubular damping force control member 75 is provided at the lower end of the spring 74. A ring-shaped disk valve 76 is provided between the lower end face of the guide member 68 and a fulcrum member 77 that is attached to the lower end of the passage member 63, the disk valve 76 being arranged to offer resistance to the flow of the hydraulic fluid from the hydraulic fluid passage 69 to the lower cylinder chamber 60b during the extension stroke, thereby generating a damping force. The inner peripheral portion of the disk valve 76 is biased downwardly by the damping force control member 75, so that the outer peripheral portion of the disk valve 76 is pressed against the guide member 68. Thus, the level of damping force generated during the extension stroke is controlled by changing the level of biasing force from the spring 74 of the damping force control member 75, as described later.

The center of the damping force control member 75 is provided with a hydraulic fluid passage 75a, and the center of the fulcrum member 77 with a hydraulic fluid passage 77a. In addition, an orifice passage 78 is provided at an intermediate portion of the hydraulic fluid passage 69 in the guide 68, the orifice passage 78 being arranged such that, when it is open, the orifice passage 78 provides communication between the hydraulic fluid passage 69 and the lower chamber 70b in the guide 68, whereas, when it is closed by the shutter 71, the orifice passage 78 cuts off the communication between the hydraulic fluid passage 69 and the lower chamber 70b. Thus, the hydraulic fluid passages 75a and 77a constitute in combination a bypass passage 79 that provides communication between the upper and lower cylinder chambers 60a and 60b through the orifice passage 78.

The operation of the fifth embodiment arranged as described above will next be explained.

Normally, the shutter 71 is held in the raised position by the resilient force from the spring 74 and hence the orifice passage 78 is kept open. During the extension stroke, therefore, the hydraulic fluid in the upper cylinder chamber 60a passes through the passage 67, the chamber 63a inside the passage member 63 and the hydraulic fluid passage 69 to flow into the lower cylinder chamber 60b through the bypass passage 79 as the piston 62 slides. At this time, the hydraulic fluid in the chamber 63a flows into the upper chamber 70a in the guide 68 through the orifice 72a in accordance with the frequency of vibration of the piston 62, causing the shutter 71 to slide downwardly against the resilient force from the spring 74. Thus, the damping force is controlled through the orifice passage 78 by the sliding motion of the shutter 71 in accordance with the frequency of vibration of the piston 62 in the same way as in the first embodiment.

The following is an explanation of the damping force control that is effected by the disk valve 76.

When the shutter 71 does not slide, the spring 74 is in a decompressed state. Therefore, the damping force control member 75 is biased with a relatively weak force, so that the outer peripheral portion of the disk valve 76 is pressed against the guide member 68 with a relatively weak force. In consequence, the disk valve 76 provides a relatively small damping force. In contrast, when the shutter 71 slides, the spring 74 is compressed. Accordingly, the force with which the damping force control member 75 is biased downwardly increases in accordance with the sliding motion of the shutter 71, so that the outer peripheral portion of the disk valve 76 is pressed against the guide member 68 with a relatively strong force, resulting in a rise in the level of the damping force generated by the disk valve 76.

During the contraction stroke, the check valve mechanism 66 allows the hydraulic fluid to flow from the lower cylinder chamber 60b to the upper cylinder chamber 60a through the hydraulic fluid passage 64 with substantially no resistance, so that substantially no damping force is generated at the piston 62. At this time, a damping force is generated by a base valve (not shown).

Thus, the fifth embodiment enables the orifice characteristics to change in accordance with the frequency of vibration of the piston 62 during the extension stroke and also permits the valve characteristics to change in accordance with the sliding motion of the shutter 71.

Although in this embodiment the tubular guide, the shutter and the bypass passage, which constitute the essential part of the present invention, are provided in the piston unit, it should be noted that these constituent elements may be provided in the base valve unit.

In the hydraulic shock absorbers according to the foregoing embodiments arranged as detailed above, the shutter that opens and closes the orifice passage is caused to slide by the flow of the hydraulic fluid that is induced by the sliding motion of the piston such that, when the frequency of vibration of the piston is high, the degree of opening of the orifice passage is large, to generate a small damping force, whereas, when the frequency of vibration of the piston is low, the degree of opening of the orifice passage is small, to generate a large damping force. As a result, when the vehicle is running in a normal state where the unsprung part of the suspension system is subject to fine vibration, a relatively small damping force is generated, whereas, as the amplitude of vibration increases and the frequency of vibration lowers, the orifice characteristics change so as to generate a relatively large damping force. When the vehicle is making a turn or being braked, that is, when the unsprung part of the suspension system is subject to relatively slow and large vibration, the orifice passage is closed to generate a relatively large damping force. Thus, the orifice characteristics are changed in accordance with the frequency of vibration under the spring of the suspension system, thereby making the vehicle even more comfortable to ride in and improving the steering stability.

The two embodiments described below provide hydraulic shock absorbers wherein both orifice and valve characteristics change in accordance with the frequency of vibration under the spring of the suspension system.

Figure 12:
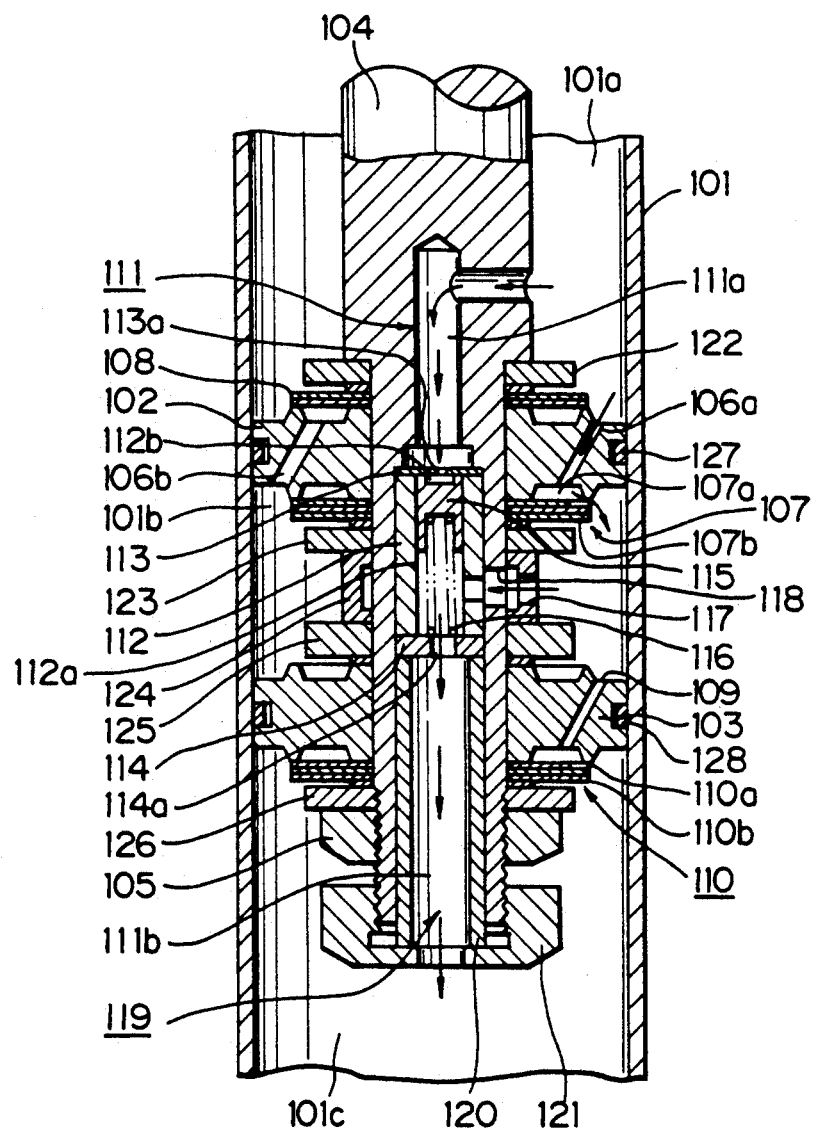
FIG. 12 is a longitudinal sectional view of an essential part of a sixth embodiment of the present invention.

Referring to FIG. 12, which shows an essential part of a sixth embodiment of the present invention, a cylinder 101 having a hydraulic fluid sealed therein is slidably fitted with two pistons 102 and 103, which divide the inside of the cylinder 101 into three chambers, that is, an upper cylinder chamber 101a, a central cylinder chamber 101b and a lower cylinder chamber 101c. A piston rod 104 extends through the pistons 102 and 103 and is secured thereto by use of a nut 105. The piston 102 is provided with communicating passages 106a and 106b, which provide communication between the upper and central cylinder chambers 101a and 101b. The end of the piston 102 which is closer to the central cylinder chamber 101b is provided with a damping force generating mechanism 107 that comprises an orifice 107a and a disk valve 107b, while the end of the piston 102 which is closer to the upper cylinder chamber 101a is provided with a damping force generating mechanism 108 that comprises a disk valve. The piston 103 is provided with a communicating passage 109 that provides communication between the central and lower cylinder chambers 101b and 101c. The end of the piston 103 which is closer to the lower cylinder chamber 101c is provided with a damping force generating mechanism 110 that comprises an orifice 110a and a disk valve 110b.

The piston rod 104 is provided with an axially extending communicating passage 111 that provides communication between the upper and lower cylinder chambers 101a and 101c. The communicating passage 111 is fitted with a tubular guide 112 that communicates at one end thereof with the upper cylinder chamber 101a and at the other end with the lower cylinder chamber 101c. The end of the guide 112 which is closer to the upper cylinder chamber 101a is provided with a partition plate 113 formed with an orifice 113a, and the end of the guide 112 which is closer to the lower cylinder chamber 101c is provided with a partition plate 114 formed with a bore 114a. The guide 112 has a shutter 115 slidably fitted in a fitting bore 112a provided in the guide 112. A pressure chamber 112b is defined between the shutter 115 and the partition plate 113, and a spring 116 with a relatively weak force is interposed between the shutter 115 and the partition plate 114 to bias the shutter 115 toward the partition plate 113. The side wall of the fitting bore 112a in the guide 112 is provided with an orifice passage 117 that can be opened and closed by the sliding motion of the shutter 115. The orifice passage 117 communicates with the central cylinder chamber 101b through a bore 118 provided in the side wall of the piston rod 104. Thus, the bore 118 in the piston rod 104, the inside of the guide 112, the bore 114a in the partition plate 114 and a portion of the communicating passage 111 which is closer to the lower cylinder chamber 101c, that is, a communicating passage 111b, constitute in combination a bypass passage 119 that provides communication between the central and lower cylinder chambers 101b and 101c through the orifice passage 117.

It should be noted that the guide 112 is secured to the piston rod 104 by use of a spacer 120 and a nut 121. Reference numerals 122, 123, 124, 125 and 126 in FIG. 12 denote spacers used to effect positioning of the pistons 102 and 103, and reference numerals 127 and 128 are piston rings.

The operation of the sixth embodiment arranged as described above will next be explained.

Normally, the shutter 115 is in the raised position closer to the partition plate 113 by the biasing force from the spring 116, so that the orifice passage 117 remains open.

During the extension stroke of the hydraulic shock absorber of this embodiment, the hydraulic fluid in the upper cylinder chamber 101a is pressurized to flow into the central cylinder chamber 101b through the communicating passage 106a. At this time, the hydraulic fluid in the upper cylinder chamber 101a flows into the pressure chamber 112b in the guide 112 through the orifice 113a in the partition plate 113 in the communicating passage 111a, which is a portion of the communicating passage 111 that is closer to the upper cylinder chamber 101a, thus causing the shutter 115 to move toward the partition plate 114 against the resilient force from the spring 116.

When the frequency of vibration of the pistons 102 and 103 is high, the amount of hydraulic fluid flowing into the pressure chamber 112b in the guide 112 through the orifice 113a is small and hence the amount of movement of the shutter 115 is small. Accordingly, the orifice passage 117 remains open, so that the hydraulic fluid that flows into the central cylinder chamber 101b from the upper cylinder chamber 101a through the communicating passage 106a passes through the bypass passage 119 with substantially no resistance and flows into the lower cylinder chamber 101c, as shown by the arrows in FIG. 12. Thus, a small damping force is generated by virtue of the orifice and valve characteristics of only the damping force generating mechanism 107, which comprises the orifice 107a and the disk valve 107b.

When the frequency of vibration of the pistons 102 and 103 lowers, the amount of hydraulic fluid flowing into the pressure chamber 112b in the guide 112 through the orifice 113a in the partition plate 113 increases, so that the amount of movement of the shutter 115 increases. Accordingly, the orifice passage 117 begins to close, and the degree of opening of the orifice passage 117 decreases in accordance with the movement of the pistons 102 and 103, causing the damping force to increase in inverse proportion.

Figure 13:
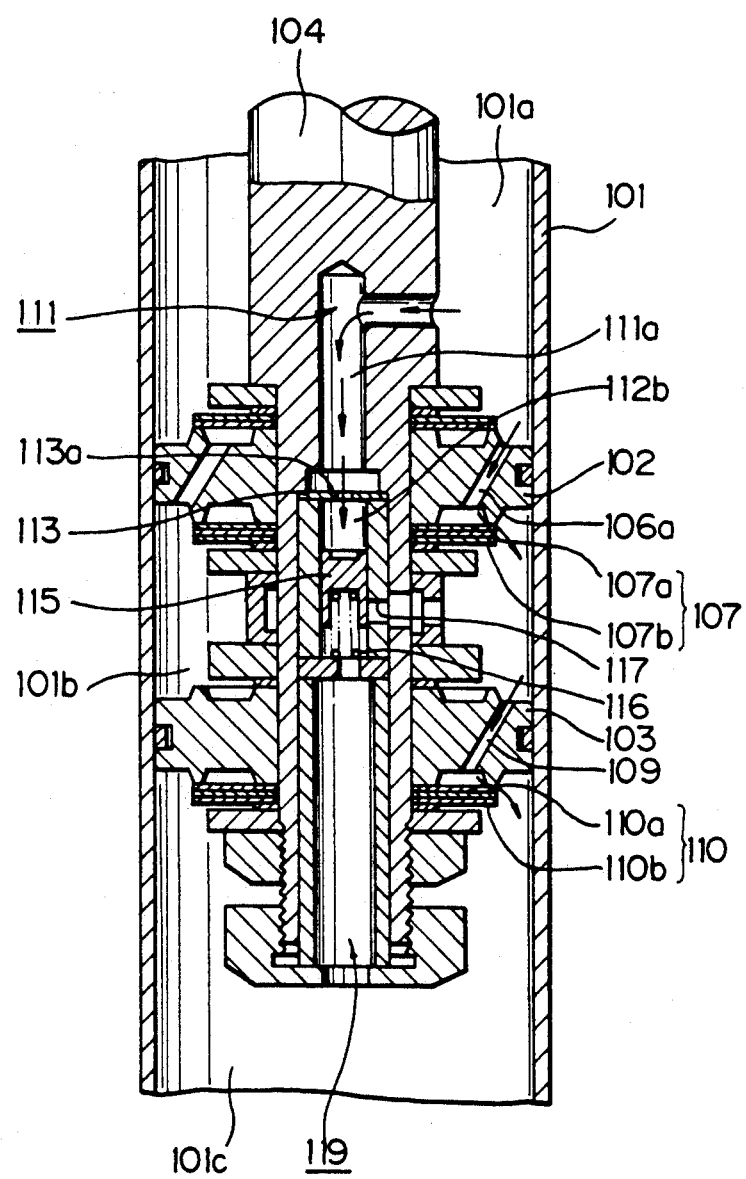
FIG. 13 shows the apparatus shown in FIG. 12 in a state where a passage is closed during the extension stroke.

When the frequency of vibration of the pistons 102 and 103 further lowers and the orifice passage 117 is eventually closed, the hydraulic fluid in the central cylinder chamber 101b flows into the lower cylinder chamber 101c through the communicating passage 109, as shown by the arrows in FIG. 13, thus causing damping force to be generated by the damping force generating mechanism 110 comprising the orifice 110a and the disk valve 110b. Accordingly, a large damping force is generated by virtue of the orifice and valve characteristics of both the damping force generating mechanism 107 of the piston 102 and the damping force generating mechanism 110 of the piston 103.

Thus, the orifice and valve characteristics can be changed in accordance with the frequency of vibration.

Figure 14:
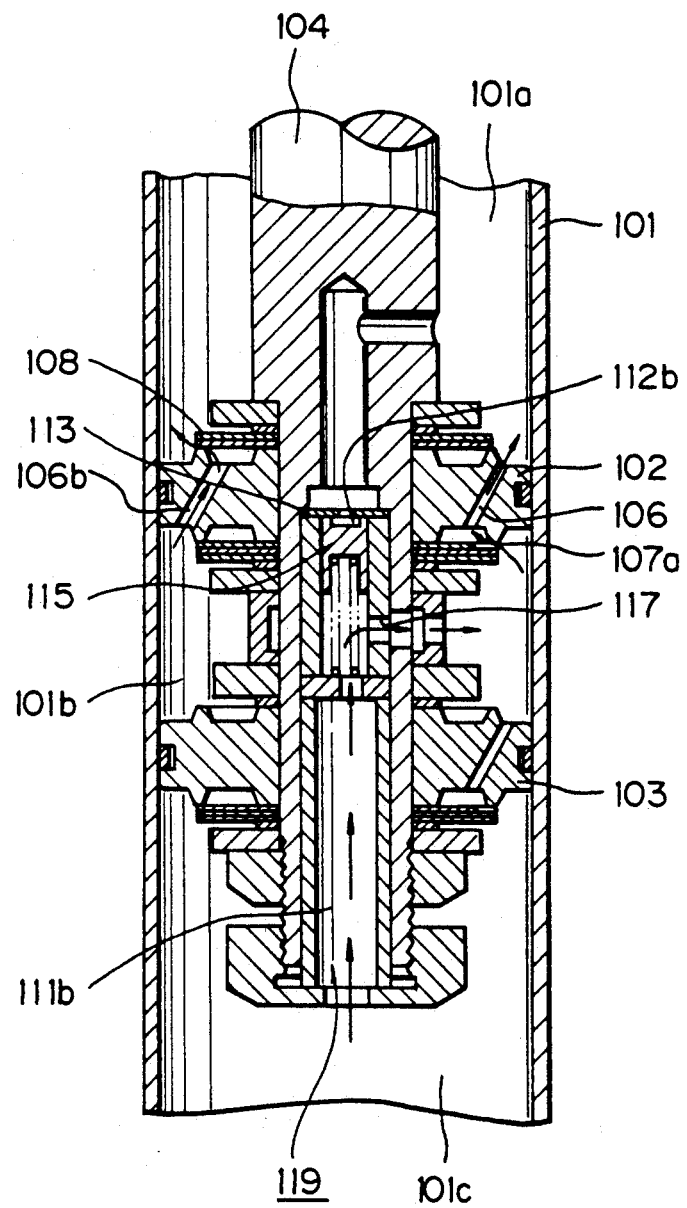
FIG. 14 shows the apparatus shown in FIG. 12 during the contraction stroke.

During the contraction stroke, the hydraulic fluid in the lower cylinder chamber 101c is pressurized, so that the shutter 115 is pressed toward the partition plate 113 by the hydraulic pressure in the lower cylinder chamber 101c. Accordingly, the orifice passage 117 remains open, so that the hydraulic fluid in the lower cylinder chamber 101c flows into the central cylinder chamber 101b through the bypass passage 119 with substantially no resistance and the hydraulic fluid in the central cylinder chamber 101b flows into the upper cylinder chamber 101a through the communicating passage 106b, as shown by the arrows in FIG. 14, thus activating the damping force generating mechanism 108 to generate a damping force.

Figure 15:
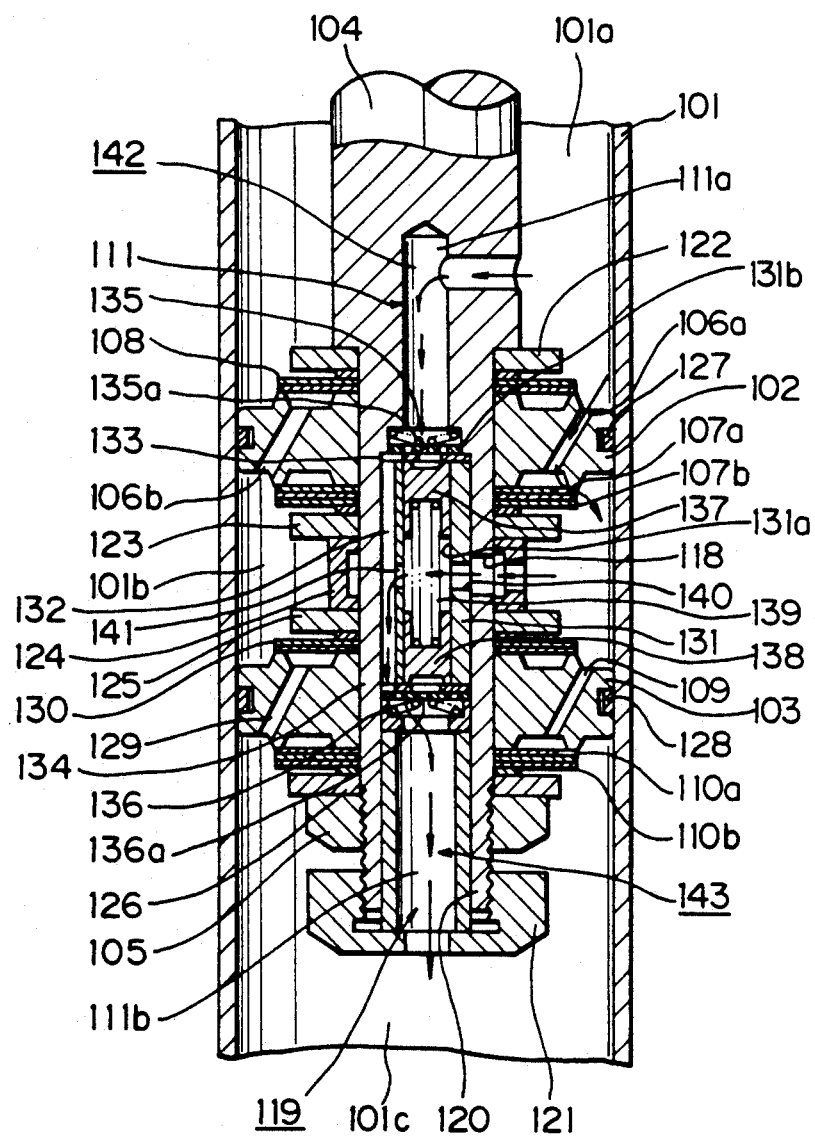
FIG. 15 is a longitudinal sectional view of an essential part of a seventh embodiment of the present invention.

A seventh embodiment of the present invention will next be explained. FIG. 15 shows an essential part of the seventh embodiment of the present invention. In FIG. 15, members which correspond to those in the sixth embodiment are denoted by the same reference numerals, and detailed description will be made only on a portion of the seventh embodiment that is different from the sixth embodiment.

Referring to FIG. 15, the piston 103 is provided with a communicating passage 129 that provides communication between the central and lower cylinder chambers 101b and 101c. The end of the piston 103 which is closer to the central cylinder chamber 101b is provided with a damping force generating mechanism 130 comprising a disk valve.

The communicating passage 111 is fitted with a tubular guide 131. A passage 132 is defined between a groove provided in the outer periphery of the guide 131 and the inner peripheral surface of the communicating passage 111, the passage 132 communicating at one end thereof with the communicating passage 111a, which is closer to the upper cylinder chamber 101a, and at the other end with the communicating passage 111b, which is closer to the lower cylinder chamber 101c. Partition plates 133 and 134 are provided on both ends, respectively, of the guide 131. The partition plate 133 is provided with a check valve mechanism 135 which allows circulation of the hydraulic fluid from the passage 132 to the communicating passage 111a but prevents circulation of the hydraulic fluid from the communicating passage 111a to the passage 132, and which allows circulation of the hydraulic fluid from the inside of the guide 131 to the communicating passage 111a and permits circulation of the hydraulic fluid from the communicating passage 111a to the inside of the guide 131 through an orifice 135a. The partition plate 134 is provided with a check valve mechanism 136 which allows circulation of the hydraulic fluid from the passage 132 to the communicating passage 111b but prevents circulation of the hydraulic fluid from the communicating passage 111b to the passage 132, and which allows circulation of the hydraulic fluid from the inside of the guide 131 to the communicating passage 111b and permits circulation of the hydraulic fluid from the communicating passage 111b to the inside of the guide 131 through an orifice 136a.

The guide 131 has a fitting bore 131a which is slidably fitted with a pair of shutters 137 and 138, one end of each of which is closed, and with the respective openings facing each other. Between the shutters 137 and 138 is interposed a spring 139 with a relatively weak spring force to bias the shutters 137 and 138 toward the corresponding ends of the guide 131.

The side wall of the fitting bore 131a in the guide 131 is provided with an orifice passage 140 which can be opened and closed by the sliding motion of either the shutter 137 or the shutter 138, the orifice passage 140 communicating with the central cylinder chamber 101b through the bore 118 provided in the side wall of the piston rod 104. A pressure chamber 131b is defined between the shutter 137 and the partition plate 133, and a pressure chamber 131c between the shutter 138 and the partition plate 134. In addition, the side wall of the guide 131 is provided with a bore 141 that provides communication between the inside of the guide 131 and the passage 132. Thus, the bore 118 in the piston rod 104, the inside of the guide 131, the bore 141, the passage 132, the check valve mechanism 135 on the partition plate 133 and the communicating passage 111a constitute in combination a bypass passage 142 that provides communication between the upper and central cylinder chambers 101a and 101b through the orifice passage 140, while the bore 118 in the piston rod 104, the inside of the guide 131, the bore 141, the passage 132, the check valve mechanism 136 on the partition plate 134 and the communicating passage 111b constitute in combination a bypass passage 143 that provides communication between the central and lower cylinder chambers 101b and 101c through the orifice passage 140.

The operation of the seventh embodiment arranged as described above will next be explained.

Normally, the shutters 137 and 138 are held in their respective biased positions closer to the partition plates 133 and 134 by the resilient force from the spring 139, so that the orifice passage 140 remains open.

During the extension stroke of the hydraulic shock absorber of this embodiment, the hydraulic fluid in the upper cylinder chamber 101a is pressurized to flow into the central cylinder chamber 101b through the communicating passage 106a in the same way as in the sixth embodiment. At this time, the hydraulic fluid in the upper cylinder chamber 101a flows into the pressure chamber 131b in the guide 131 through the orifice 135a in the check valve mechanism 135 provided on the partition plate 133 in the communicating passage 111a, thus causing the shutter 137 to move toward the partition plate 134 against the resilient force from the spring 139. It should be noted that the circulation of the hydraulic fluid from the communicating passage 111a to the passage 132 is prevented by the check valve mechanism 135.

When the frequency of vibration of the pistons 102 and 103 is high, the amount of hydraulic fluid flowing into the pressure chamber 131b in the guide 131 through the orifice 135a is small and hence the amount of movement of the shutter 137 is small. Accordingly, the orifice passage 140 remains open, so that the hydraulic fluid in the central cylinder chamber 101b flows into the lower cylinder chamber 101c through the bypass passage 143 with substantially no resistance, as shown by the arrows in FIG. 15. Thus, a small damping force is generated by virtue of the orifice and valve characteristics of only the damping force generating mechanism 107 of the piston 102, which comprises the orifice 107a and the disk valve 107b.

When the frequency of vibration of the pistons 102 and 103 lowers, the amount of hydraulic fluid flowing into the pressure chamber 131b in the guide 131 through the orifice 135a increases, and hence the amount of movement of the shutter 137 increases. Accordingly, the orifice passage 140 begins to close, and the degree of opening of the orifice passage 140 decreases in accordance with the frequency of vibration of the pistons 102 and 103, so that the damping force increases in inverse proportion.

Figure 16:
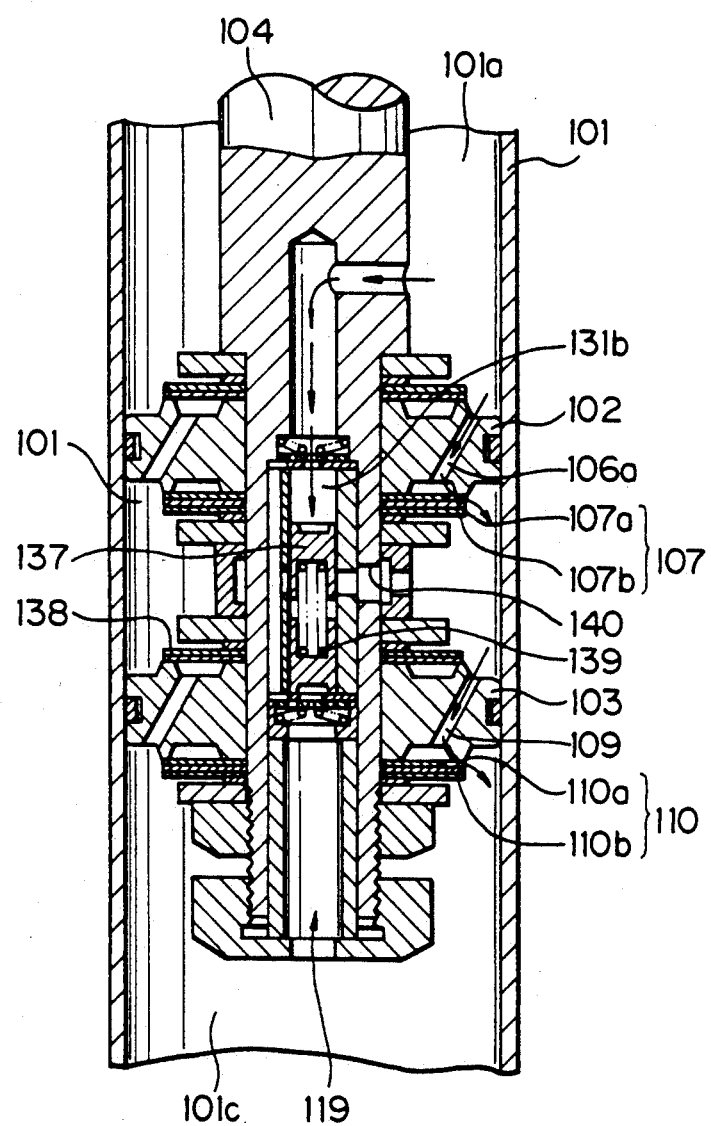
FIG. 16 shows the apparatus shown in FIG. 15 in a state where the passage is closed during the extension stroke.

When the frequency of vibration of the pistons 102 and 103 further lowers and the orifice passage 140 is eventually closed, the hydraulic fluid in the central cylinder chamber 101b flows into the lower cylinder chamber 101c through the communicating passage 109, as shown by the arrows in FIG. 16, thus causing a damping force to be generated by the damping force generating mechanism 110 comprising the orifice 110a and the disk valve 110b. Accordingly, a large damping force is generated by virtue of the orifice and valve characteristics of both the damping force generating mechanism 107 of the piston 102 and the damping force generating mechanism 110 of the piston 103.

Thus, the orifice and valve characteristics can be changed in accordance with the frequency of vibration during the extension stroke.

During the contraction stroke, the hydraulic fluid in the lower cylinder chamber 101c is pressurized to flow into the central cylinder chamber 101b through the orifice passage 110a and the communicating passages 109 and 129. At this time, the hydraulic fluid in the lower cylinder chamber 101c flows into the pressure chamber 131c in the guide 131 through the orifice 136a in the check valve mechanism 136 provided on the partition plate 134 in the communicating passage 111b, thus causing the shutter 138 to move toward the partition plate 133 against the resilient force from the spring 139. It should be noted that the circulation of the hydraulic fluid from the communicating passage 111b to the passage 132 is prevented by the check valve mechanism 136.

Figure 17:
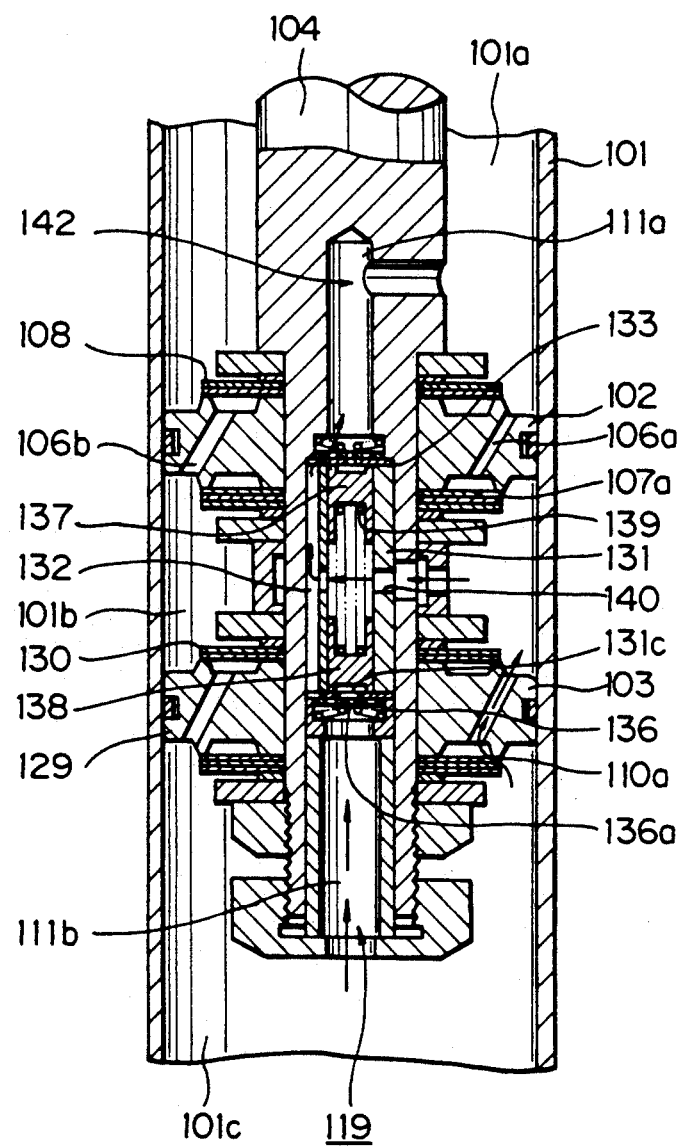
FIG. 17 shows the apparatus shown in FIG. 15 in a state where the passage is opened during the contraction stroke.

When the frequency of vibration of the pistons 102 and 103 is high, the amount of hydraulic fluid flowing into the pressure chamber 131c in the guide 131 through the orifice 136a is small and hence the amount of movement of the shutter 138 is small. Accordingly, the orifice passage 140 remains open, so that the hydraulic fluid in the central cylinder chamber 101b flows into the upper cylinder chamber 101a through the bypass passage 142 with substantially no resistance, as shown by the arrows in FIG. 17. Thus, a small damping force is generated by virtue of the orifice and valve characteristics of only the orifice 110a and the damping force generating mechanism 130 of the piston 103.

When the frequency of vibration of the pistons 102 and 103 lowers, the amount of hydraulic fluid flowing into the pressure chamber 131c in the guide 131 through the orifice 136a increases and hence the amount of movement of the shutter 138 increases. Accordingly, the orifice passage 140 begins to close, and the degree of opening of the orifice passage 140 decreases in accordance with the frequency of vibration of the pistons 102 and 103, causing the damping force to increase in inverse proportion to the reduction in the opening of the orifice passage 140.

Figure 18:
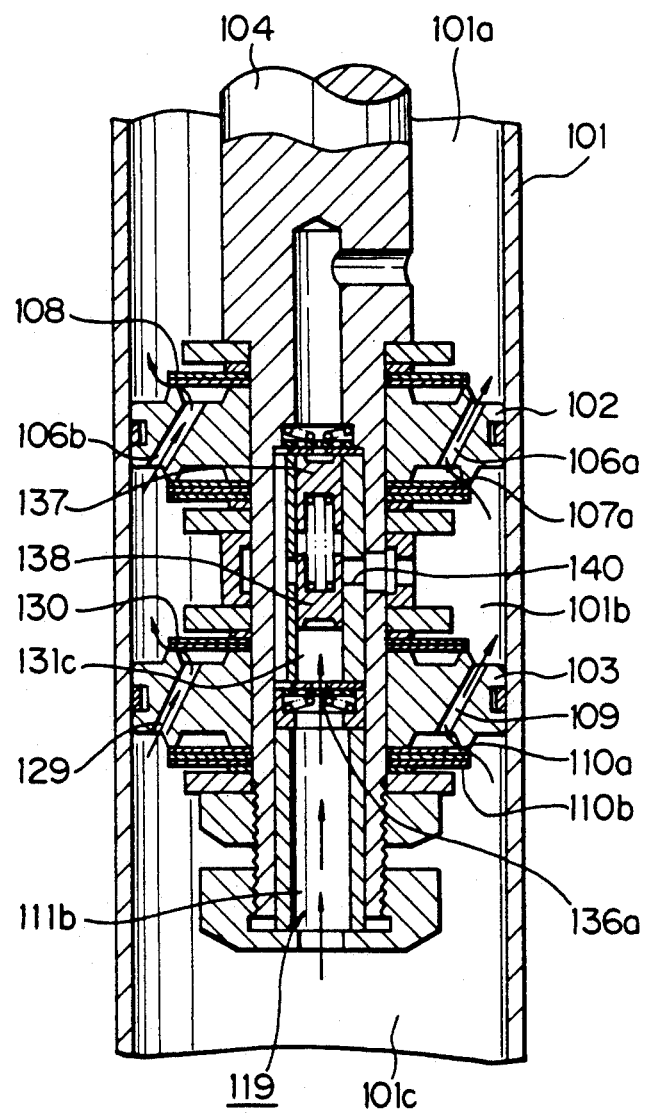
FIG. 18 shows the apparatus shown in FIG. 15 in a state where the passage is closed during the contraction stroke.

When the frequency of vibration of the pistons 102 and 103 further lowers and the orifice passage 140 is eventually closed, the hydraulic fluid in the central cylinder chamber 101b flows into the upper cylinder chamber 101a through the communicating passages 106a and 106b, as shown by the arrows in FIG. 18, thus causing a damping force to be generated by the orifice 107a and the damping force generating mechanism 108. Accordingly, a large damping force is generated by virtue of the orifice and valve characteristics of the orifice 110a and the damping force generating mechanism 130 of the piston 103 and those of the orifice 107a and the damping force generating mechanism 108 of the piston 102.

Thus, the orifice and valve characteristics can be changed in accordance with the frequency of vibration during the contraction stroke.

Although in this embodiment the fitting bore is provided in the guide, it may be formed directly in the piston rod.

In the hydraulic shock absorbers of the foregoing embodiments arranged as detailed above, a shutter that opens and closes a passage is caused to slide by the flow of a hydraulic fluid that is induced by the sliding motion of two pistons. When the frequency of vibration of the two pistons is high, the passage is open, so that the hydraulic fluid circulates through the damping force generating mechanism of one piston and the bypass passage, thus generating a small damping force in accordance with the degree of opening of the passage. When the frequency of vibration of the two pistons is low, the passage is closed and hence the bypass passage is closed, so that the hydraulic fluid circulates through the damping force generating mechanisms of the two pistons, thus generating a large damping force. As a result, it is possible to change the orifice and valve characteristics in accordance with the frequency of vibration by arranging the damping force generating mechanism of each piston to have the desired orifice and valve characteristics. Thus, it is possible to make the vehicle even more comfortable to ride in and improve the steering stability.

The two embodiments described below provide hydraulic shock absorbers wherein the orifice characteristics, or both the orifice and valve characteristics, at both the extension and contraction sides, change in accordance with the frequency of vibration under the spring of the suspension system.

Figure 19:
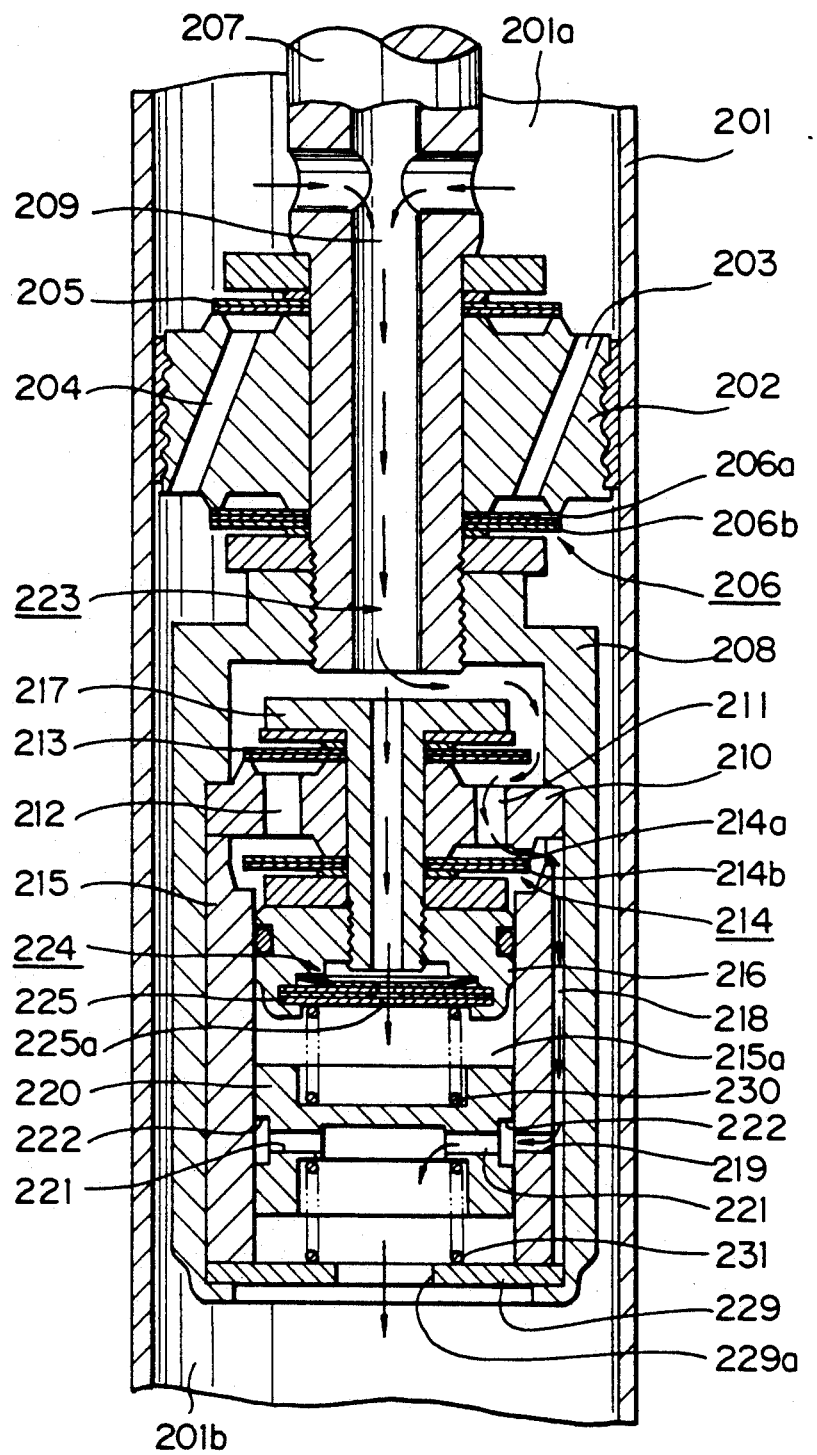
FIG. 19 is a longitudinal sectional view of an essential part of an eighth embodiment of the present invention.

Referring to FIG. 19, which shows an essential part of an eighth embodiment of the present invention, a cylinder 201 having a hydraulic fluid sealed therein is slidably fitted with a piston 202, which divides the inside of the cylinder 201 into two cylinder chambers 201a and 201b. The piston 202 is provided with hydraulic fluid passages 203 and 204 that provide communication between the cylinder chambers 201a and 201b. The end of the piston 202 which is closer to the cylinder chamber 201a is provided with a damping force generating mechanism 205 comprising a disk valve that controls the flow of the hydraulic fluid through the hydraulic fluid passage 204 to generate damping force. The end of the piston 202 which is closer to the cylinder chamber 201b is provided with a damping force generating mechanism 206 comprising an orifice 206a and a disk valve 206b, which cooperate with each other to control the flow of the hydraulic fluid through the hydraulic fluid passage 203 to generate damping force.

A piston rod 207 extends through the piston 202 from the cylinder chamber 201a to the cylinder chamber 201b. A cylindrical passage member 208 is attached by thread engagement to the end portion of the piston rod 207 which extends into the cylinder chamber 201b. The piston rod 207 is provided with an axially extending hydraulic fluid passage 209 that provides communication between the cylinder chamber 201a and the inside of the passage member 208 provided inside the cylinder chamber 201b.

The passage member 208 is fitted with a partition member 210 that divides the inside of the passage member 208 into two chambers, that is, a chamber which is closer to the hydraulic fluid passage 209 and a chamber which is closer to the cylinder chamber 201b. The partition member 210 is provided with hydraulic fluid passages 211 and 212 that provide communication between these two chambers. The end of the partition member 210 which is closer to the hydraulic fluid passage 209 is provided with a damping force generating mechanism 213 comprising a disk valve that controls the flow of the hydraulic fluid through the hydraulic fluid passage 212 to generate damping force. The end of the partition member 210 which is closer to the cylinder chamber 201b is provided with a damping force generating mechanism 214 comprising an orifice 214a and a disk valve 214b, which cooperate with each other to control the flow of the hydraulic fluid through the hydraulic fluid passage 211 to generate a damping force. It should be noted that the damping force generating mechanisms 213 and 214 provided on the partition member 210 have orifice and valve characteristics that generate relatively small damping forces in comparison to the damping force generating mechanisms 205 and 206 provided on the piston 202.

The passage member 208 has a tubular guide 215 fitted therein, which communicates at one end thereof with the cylinder chamber 201b. A cap 216 is fitted into the end portion of the guide 215 which is closer to the partition member 210. The cap 216 is secured by thread engagement to a tubular passage member 217 that extends through the partition member 210 and the cap 216. The end of the guide 215 communicates with the cylinder chamber 201a through the passage member 217 and the hydraulic fluid passage 209. The outer periphery of the guide 215 is provided with a plurality of axial grooves. The grooves and the inner peripheral surface of the passage member 208 define hydraulic fluid passages 218 each communicating at one end thereof with a chamber defined between the partition member 210 in the passage member 208 and the cap 216. The side wall of the guide 215 is provided with a plurality of guide passages 219 that communicate with the hydraulic fluid passages 218.

Figure 20:
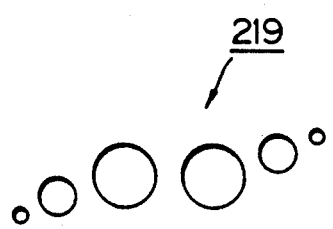
FIG. 20 shows an orifice passage in the apparatus shown in FIG. 19.

The guide 215 is slidably fitted with a tubular shutter 220, one end of which is closed in such a manner that the bottom of the shutter 220 faces the cap 216. A pressure chamber 215a is defined between one end of the shutter 220 and the cap 216. The side wall of the shutter 220 is provided with shutter passages 221. The shutter 220 has an annular groove 222 formed in an intermediate portion of its outer periphery at a position which is coincident with the openings of the shutter passages 221. Thus, one end of each shutter passage 221 is communicatable with the guide passages 219 through the annular groove 222, while the other end of each shutter passage 221 communicates with an open end of the shutter 220. The guide passages 219 and the shutter passages 221 are brought into and out of communication with each other by the sliding motion of the shutter 220. It should be noted that the guide passages 219 vary from each other in size and position, as shown in FIG. 20, so that, when the guide passages 219 and the shutter passages 221 are brought into and out of communication with each other by the sliding motion of the shutter 220, the communicating passage area changes gradually. Thus, the hydraulic fluid passage 209, the hydraulic fluid passages 211 and 212 in the partition member 210, the hydraulic fluid passages 218 and the chamber inside the guide 215 that communicates with the cylinder chamber 201b constitute in combination a bypass passage 223 that provides communication between the cylinder chambers 201a and 201b through the guide passages 219 and the shutter passages 221.

Figure 21:
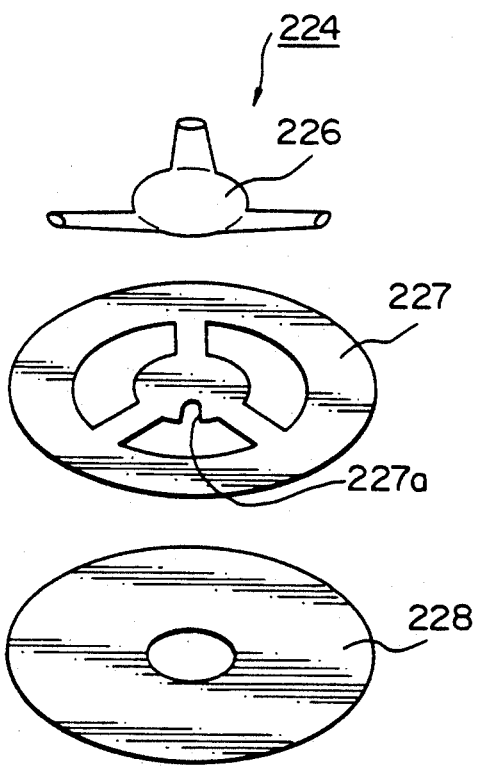
FIG. 21 is an exploded perspective view of a valve mechanism in the apparatus shown in FIG. 19.

The cap 216 that is fitted in the guide 215 is provided with a partition plate 225, which is provided with a valve mechanism 224 and an orifice 225a that control the circulation of the hydraulic fluid between the passage member 217 and the inside of the guide 215. The valve mechanism 224 comprises a valve body 226, a notched disk 227 and a disk 228, as shown in FIG. 21. Thus, when the hydraulic fluid circulates from the passage member 217 to the pressure chamber 215a in the guide 215, the respective central portions of the valve body 226, the notched disk 227 and the disk 228 are brought into close contact with each other by the hydraulic pressure, so that the notch 227a in the disk 227 forms an orifice (the passage area is determined by the width of the notch 227a and the plate thickness of the notched disk 227) which controls the circulation of the hydraulic fluid. When the hydraulic fluid flows out into the passage member 217 from the pressure chamber 215a in the guide 215, the valve body 226 is deflected by the hydraulic pressure so as to separate from the notched disk 227, thereby allowing the circulation of the hydraulic fluid. Accordingly, when the hydraulic fluid flows out into the passage member 217 from the pressure chamber 215a in the guide 215, the circulation of the hydraulic fluid is controlled by the orifice 225a in the partition plate 225. More specifically, the passage area of the orifice formed by the notch 227a is smaller than that of the orifice 225a in the partition plate 225, and the passage area of the opening of the notch 227a itself is larger than the passage area of the orifice 225a in the partition plate 225.

The end of the guide 215 which is closer to the cylinder chamber 201b is provided with a partition plate 229 that is formed with a bore 229a to close the lower end of the hydraulic fluid passage 218 and provide communication between the lower chamber in the guide 215 and the cylinder chamber 201b through the bore 229a. A spring 230 is interposed between the shutter 220 and the partition plate 225, which is closer to the passage member 217, and a spring 231 is interposed between the shutter 220 and the partition plate 229, which is closer to the cylinder chamber 201b, in order to resiliently hold the shutter 220 in a neutral position where the guide passages 219 and the shutter passages 221 communicate with each other.

The operation of the eighth embodiment arranged as described above will next be explained.

Normally, the shutter 220 is resiliently held in the neutral position by the springs 230 and 231, so that the guide passages 219 and the shutter passages 221 are in communication with each other.

During the extension stroke of the hydraulic shock absorber of this embodiment, the hydraulic fluid in the cylinder chamber 201a is pressurized, and the resulting hydraulic pressure is transmitted to the inside of the guide 215 through the hydraulic fluid passage 209, the passage member 217, the valve mechanism 224 and the orifice 225a, causing the shutter 220 to move toward the partition plate 229.

Figure 29:
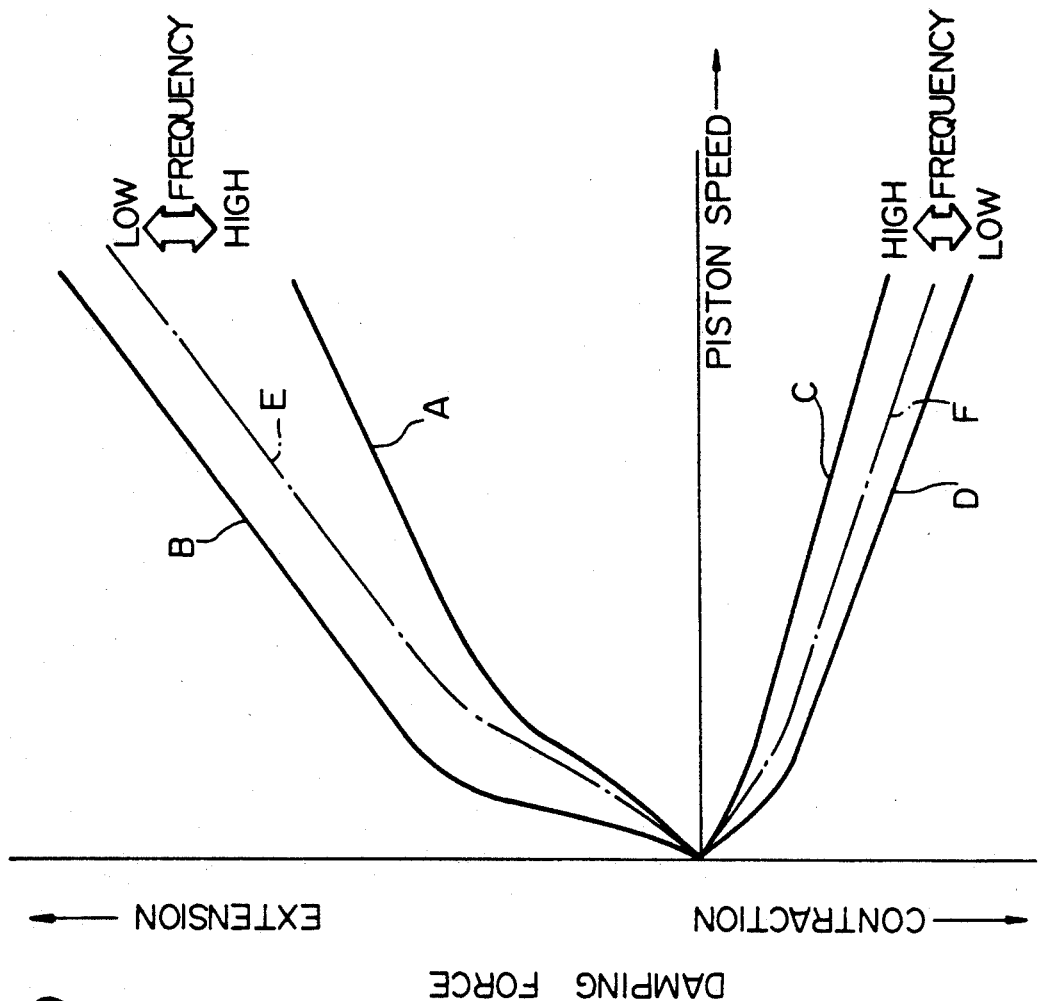
FIG. 29 is a graph showing damping force characteristics of the hydraulic shock absorber according to the present invention.

When the frequency of vibration of the piston 202 is high, the amount of hydraulic fluid flowing into the pressure chamber 215a in the guide 215 through the orifice formed by the notch 227a in the valve mechanism 224 is small and hence the amount of downward movement of the shutter 220 is small. Accordingly, the guide passages 219 and the shutter passages 221 are in communication with each other, so that the hydraulic fluid in the cylinder chamber 201a flows into the cylinder chamber 201b through the bypass passage 223, as shown by the arrows in FIG. 19. Thus, a small damping force with characteristics shown by the curve A in FIG. 29 is generated by virtue of the orifice and valve characteristics of the damping force generating mechanism 214 on the partition member 210.

When the frequency of vibration of the piston 202 lowers, the amount of hydraulic fluid flowing into the pressure chamber 215a in the guide 215 through the orifice formed by the notch 227a in the valve mechanism 224 increases, and hence the amount of downward movement of the shutter 220 increases. Accordingly, the communication between the guide passages 219 and the shutter passages 221 begins to be cut off, so that the passage area determined by the guide passages 219 and the shutter passages 221 decreases in accordance with the frequency of vibration of the piston 202 and the damping force increases in inverse proportion.

Figure 22:
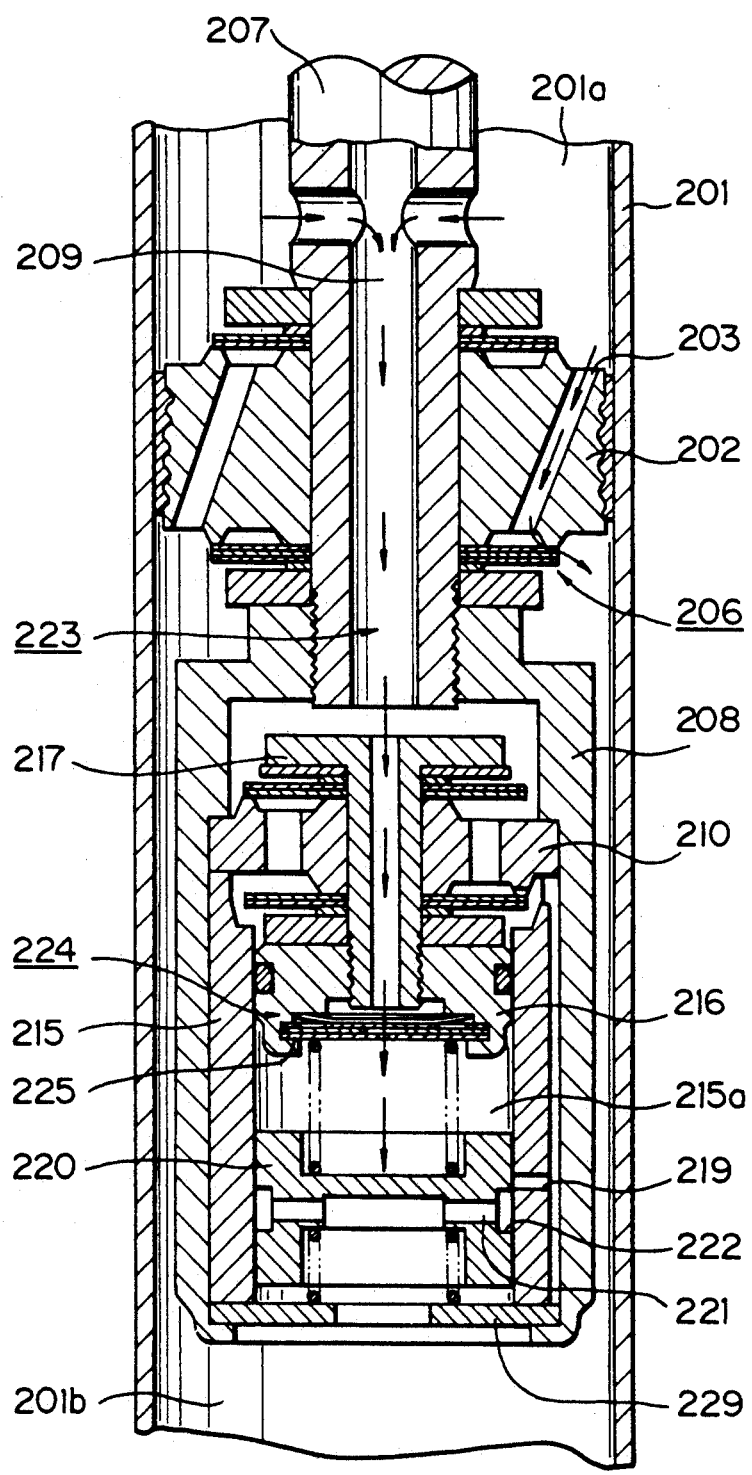
FIG. 22 shows the apparatus shown in FIG. 19 in a state where the orifice passage is closed during the extension stroke.

When the frequency of vibration of the piston 202 further lowers and the communication between the guide passages 219 and the shutter passages 221 is eventually cut off, the hydraulic fluid in the cylinder chamber 201a passes only through the hydraulic fluid passage 203 in the piston 202 to flow into the cylinder chamber 201b, as shown by the arrows in FIG. 22. Accordingly, a large damping force with characteristics shown by the curve B in FIG. 29 is generated by virtue of the orifice and valve characteristics of the damping force generating mechanism 206 provided on the piston 202.

During the contraction stroke, the hydraulic fluid in the cylinder chamber 201b is pressurized, and the resulting hydraulic pressure is transmitted to the inside of the guide 215 through the bore 229a in the partition plate 229, causing the shutter 220 to move toward the partition plate 225. At this time, the amount and speed of movement of the shutter 220 are controlled by the resistance that occurs when the hydraulic fluid in the area between the shutter 220 and the cap 216 circulates through the orifice 225a in the partition plate 225 as the shutter 220 moves.

Figure 23:
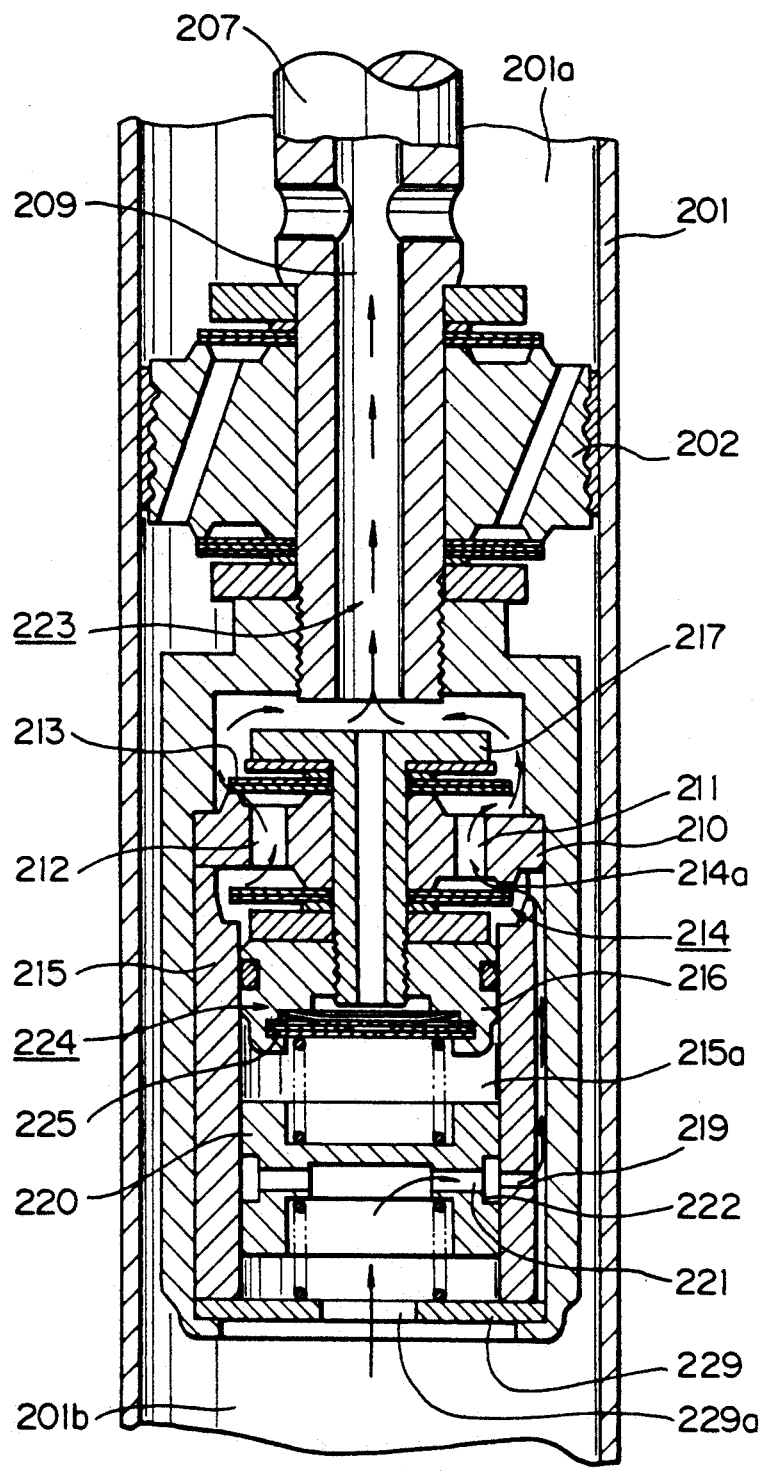
FIG. 23 shows the apparatus shown in FIG. 19 in a state where the orifice passage is opened during the contraction stroke.

When the frequency of vibration of the piston 202 is high, the amount of hydraulic fluid flowing into the passage member 217 from the pressure chamber 215a in the guide 215 through the bore 229a is small, and hence the amount of upward movement of the shutter 220 is small. Accordingly, the guide passages 219 and the shutter passages 221 are in communication with each other, so that the hydraulic fluid in the cylinder chamber 201b flows into the cylinder chamber 201a through the bypass passage 223, as shown by the arrows in FIG. 23. Thus, a small damping force, with characteristics shown by the curve C in FIG. 29, is generated by virtue of the orifice and valve characteristics of the damping force generating mechanism 213 and the orifice 214a of the partition member 210.

When the frequency of vibration of the piston 202 lowers, the amount of hydraulic fluid flowing into the passage member 217 from the pressure chamber 215a in the guide 215 through the bore 229a increases and hence the amount of upward movement of the shutter 220 increases. Accordingly, the communication between the guide passages 219 and the shutter passages 221 begins to be cut off, so that the communicating passage area that is determined by the guide passages 219 and the shutter passages 221 decreases in accordance with the frequency of vibration of the piston 202 and the damping force increases in inverse proportion.

Figure 24:
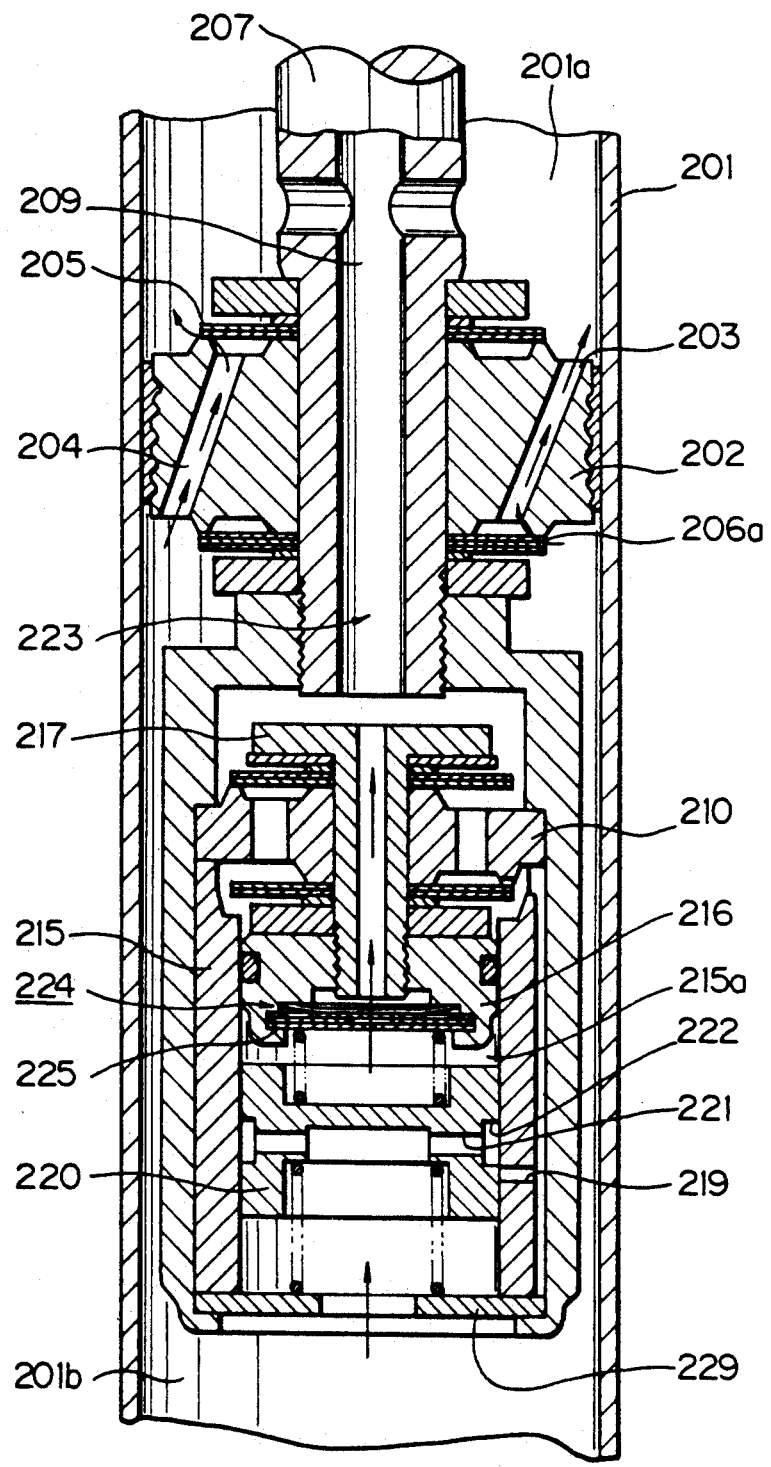
FIG. 24 shows the apparatus shown in FIG. 19 in a state where the orifice passage is closed during the contraction stroke.

When the frequency of vibration of the piston 202 further lowers and the communication between the guide passages 219 and the shutter passages 221 is eventually cut off, the hydraulic fluid in the cylinder chamber 201b passes only through the hydraulic fluid passages 203 and 204 in the piston 202 to flow into the cylinder chamber 201a, as shown by the arrows in FIG. 24. Accordingly, a large damping force with characteristics shown by the curve D in FIG. 29 is generated by virtue of the orifice and valve characteristics of the damping force generating mechanism 205 and the orifice 206a of the piston 202.

Thus, the orifice and valve characteristics can be changed in accordance with the frequency of vibration during both the extension and contraction strokes.

Although in the above-described eighth embodiment the damping force generating mechanisms 213 and 214 are provided in the bypass passage 223 to change the orifice and valve characteristics of a damping force, the arrangement may be such that either or both of the guide and shutter passages 219 and 221 are provided in the form of orifice passages so that, when the guide and shutter passages 219 and 221 are in communication with each other (i.e., when the frequency of vibration of the piston 202 is high), orifice characteristics are obtained from the orifice passages and the orifice 206a in the damping force generating mechanism 206 on the piston 202. Damping force characteristics in this case are shown by the one-dot chain lines E and F in FIG. 29.

A ninth embodiment of the present invention will next be explained.

Figure 25:
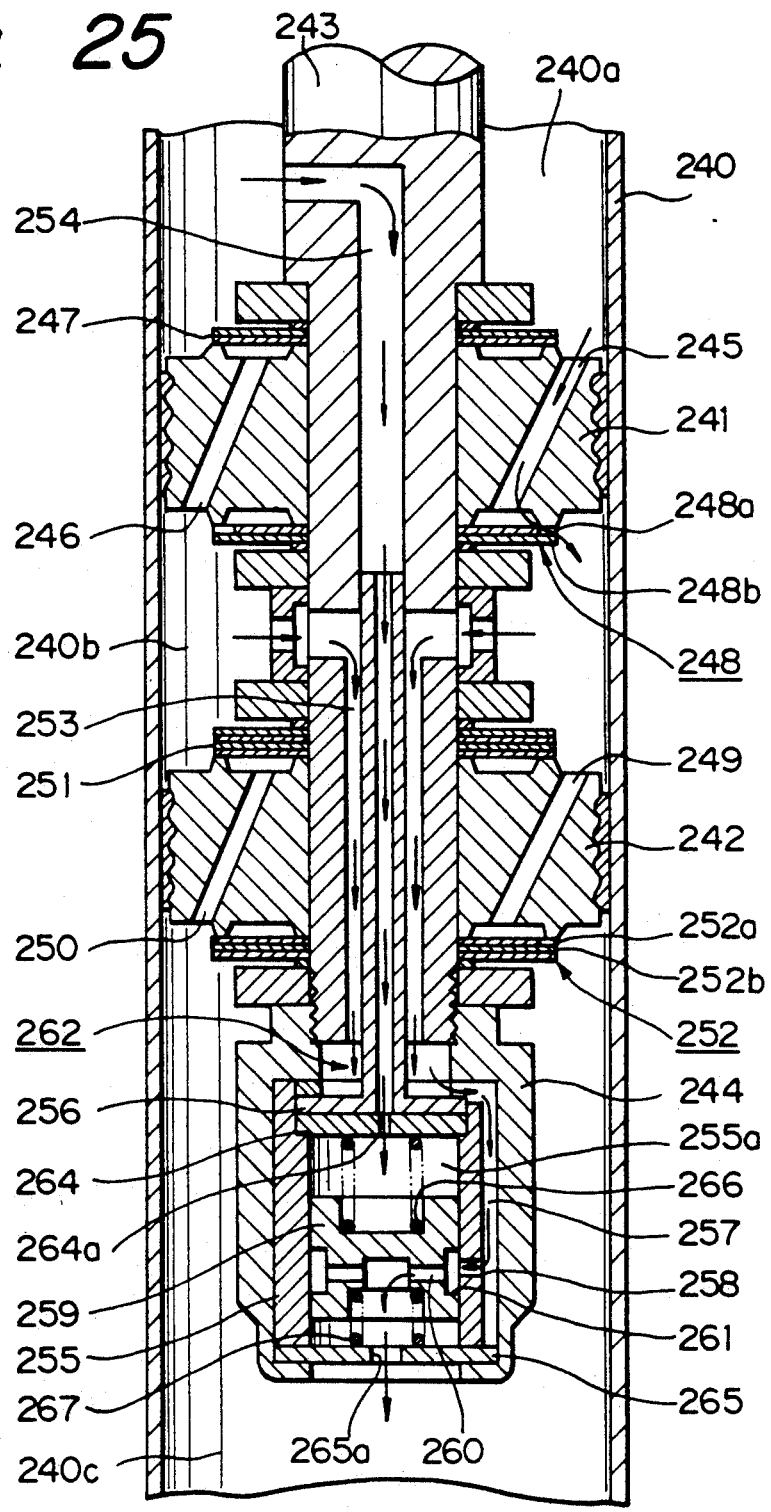
FIG. 25 is a longitudinal sectional view of an essential part of a ninth embodiment of the present invention.

Referring to FIG. 25, which shows an essential part of the ninth embodiment of the present invention, a cylinder 240 having a hydraulic fluid sealed therein is slidably fitted with two pistons 241 and 242, thereby dividing the inside of the cylinder 240 into three chambers, that is, an upper cylinder chamber 240a and a lower cylinder chamber 240c, which are defined outside the two pistons 241 and 242, and a central cylinder chamber 240b which is defined between the two pistons 241 and 242. A piston rod 243 extends through the pistons 241 and 242 from the upper cylinder chamber 240a, and a tubular passage member 244 is attached by thread engagement to the end portion of the piston rod 243 that extends into the lower cylinder chamber 240c.

The piston 241 is provided with passages 245 and 246 that provide communication between the upper cylinder chamber 240a and the central cylinder chamber 240b. The end of the piston 241 which is closer to the upper cylinder chamber 240a is provided with a damping force generating mechanism 247 comprising a disk valve that controls the flow of the hydraulic fluid through the passage 246 to generate a damping force. The end of the piston 241 which is closer to the central cylinder chamber 240b is provided with a damping force generating mechanism 248 comprising an orifice 248a and a disk valve 248b, which cooperate with each other to control the flow of the hydraulic fluid through the passage 245 to generate a damping force. The piston 242 is provided with passages 249 and 250 that provide communication between the central cylinder chamber 240b and the lower cylinder chamber 240c. The end of the piston 242 which is closer to the central cylinder chamber 240b is provided with a damping force generating mechanism 251 comprising a disk valve that controls the flow of the hydraulic fluid through the passage 250 to generate a damping force. The end of the piston 242 which is closer to the lower cylinder chamber 240c is provided with a damping force generating mechanism 252 comprising an orifice 252a and a disk valve 252b, which cooperate with each other to control the flow of the hydraulic fluid through the passage 249 to generate damping force. It should be noted that the damping force generating mechanisms 251 and 252 provided on the piston 242 may have orifice and valve characteristics that generate a relatively large damping force in comparison to the damping force generating mechanisms 247 and 248 provided on the piston 241. It is also possible to set these two pairs of damping force generating mechanisms in inverse relation to the above.

The piston rod 243 is provided with an axially extending hydraulic fluid passage 253 that provides communication between the inside of the passage member 244 provided in the lower cylinder chamber 240c and the central cylinder chamber 240b. The piston rod 243 is further provided with a hydraulic fluid passage 254 that provides communication between the hydraulic fluid passage 253 and the upper cylinder chamber 240a.

The passage member 244 is fitted with a tubular guide 255 that communicates at one end thereof with the lower cylinder chamber 240c, and a tubular passage member 256 is connected at its proximal end to the other end of the guide 255. The passage member 256 is inserted into the hydraulic fluid passage 253 and the distal end of the passage member 256 is fitted into the hydraulic fluid passage 254. Accordingly, the guide 255 communicates at one end thereof with the lower cylinder chamber 240c and at the other end with the upper cylinder chamber 240a through the passage member 256 and the hydraulic fluid passage 254.

The outer periphery of the guide 255 is provided with a plurality of axial grooves, which cooperate with the inner peripheral surface of the passage member 244 to define hydraulic fluid passages 257 each communicating at one end thereof with the hydraulic fluid passage 253 in the piston rod 243. The side wall of the guide 255 is provided with a plurality of guide passages 258 that communicate with the hydraulic fluid passages 257.

The guide 255 is slidably fitted with a tubular shutter 259, one end of which is closed in such a manner that the top of the shutter 259 faces the passage member 256. A pressure chamber 255a is defined between one end of the shutter 259 and a partition plate 264 (described later). The side wall of the shutter 259 is provided with shutter passages 260. The shutter 259 has an annular groove 261 formed in an intermediate portion of its outer periphery at a position which is coincident with the openings of the shutter passages 260. Thus, one end of each shutter passage 260 is communicatable with the guide passages 258 through the annular groove 261, while the other end of each shutter passage 260 communicates with the other end of the shutter 259. The guide passages 258 and the shutter passage 260 are brought into and out of communication with each other by the sliding motion of the shutter 259. It should be noted that the guide passages 258 vary from each other in size and position, in the same way as in the eighth embodiment, so that, when the guide passages 258 and the shutter passages 260 are brought into and out of communication with each other by the sliding motion of the shutter 259, the communicating passage area changes gradually. Thus, the hydraulic fluid passages 253 and 257 and the chamber inside the guide 255 that communicates with the lower cylinder chamber 240c constitute in combination a bypass passage 262 that provides communication between the central and lower cylinder chambers 240b and 240c through the guide passages 258 and the shutter passages 260.

Between the guide 255 and the tubular passage member 256 is interposed a partition plate 264 that is provided with an orifice (orifice passage) 264a, and a partition plate 265 with a bore 265a is provided at the end of the guide 255 closer to the lower cylinder chamber 240c. Thus, the amount and speed of upward and downward sliding of the shutter 259 are controlled by offering resistance with the orifice 256a to the circulation of the hydraulic fluid between the inside of the guide 255 and the passage member 256 that accompanies the sliding motion of the shutter 259. A spring 266 is interposed between the shutter 259 and the partition plate 264, which is closer to the passage member 256, and a spring 267 is interposed between the shutter 259 and the partition plate 265, which is closer to the lower cylinder chamber 240c, in order to resiliently hold the shutter 259 in a neutral position where the guide passages 258 and the shutter passages 260 communicate with each other.

The operation of the ninth embodiment arranged as described above will next be explained.

During the extension stroke of the hydraulic shock absorber of this embodiment, the hydraulic fluid in the upper cylinder chamber 240a is pressurized to flow into the central cylinder chamber 240b through the passage 245 in the piston 241. At this time, the hydraulic pressure in the upper cylinder chamber 240a is transmitted to the inside of the guide 255 through the hydraulic fluid passage 254 in the piston rod 243, the passage member 256 and the orifice 264a in the partition plate 264, causing the shutter 259 to move toward the partition plate 265.

When the frequency of vibration of the pistons 241 and 242 is high, the amount of hydraulic fluid flowing into the pressure chamber 255a in the guide 255 through the orifice 264a is small and hence the amount of downward movement of the shutter 259 is small. Accordingly, the guide passages 258 and the shutter passages 260 are in communication with each other, so that the hydraulic fluid in the central cylinder chamber 240b passes through the bypass passage 262 with substantially no resistance to flow into the lower cylinder chamber 240c, as shown by the arrows in FIG. 25. Thus, a small damping force is generated by virtue of the orifice and valve characteristics of only the damping force generating mechanism 248 of the piston 241.

When the frequency of vibration of the pistons 241 and 242 lowers, the amount of hydraulic fluid flowing into the pressure chamber 255a in the guide 255 through the orifice 264a increases and hence the amount of movement of the shutter 259 increases. Accordingly, the communication between the guide and shutter passages 258 and 260 begins to be cut off, so that the communicating passage area that is determined by the guide and shutter passages 258 and 260 decreases in accordance with the frequency of vibration of the pistons 241 and 242 and the damping force increases in inverse proportion to it.

Figure 26:
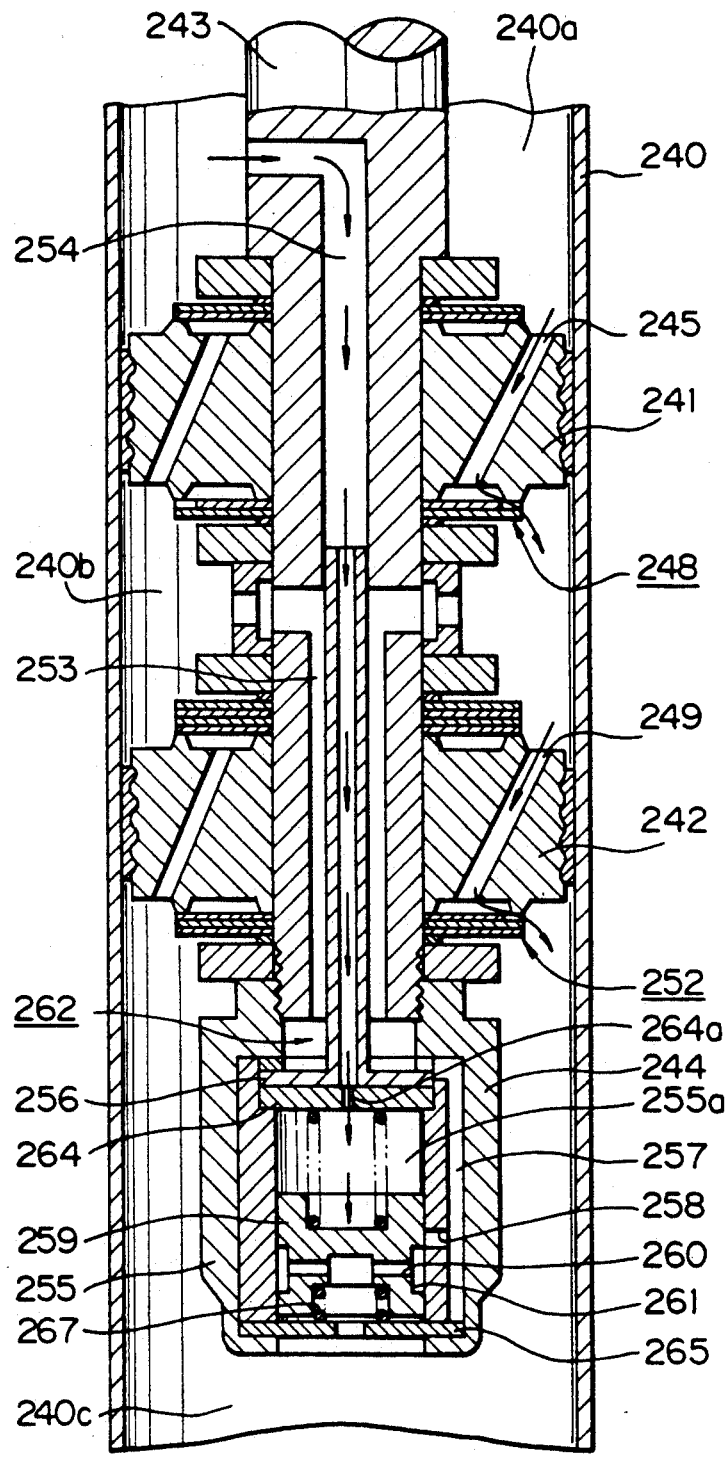
FIG. 26 shows the apparatus shown in FIG. 25 in a state where the orifice passage is closed during the extension stroke.

When the frequency of vibration of the pistons 241 and 242 further lowers and the communication between the guide and shutter passages 258 and 260 is eventually cut off, the hydraulic fluid in the central cylinder chamber 240b flows into the lower cylinder chamber 240c through the hydraulic fluid passage 249 in the piston 242, as shown by the arrows in FIG. 26. Accordingly, a large damping force is generated by virtue of the orifice and valve characteristics of both the damping force generating mechanism 248 on the piston 241, which comprises the orifice 248a and the disk valve 248b, and the damping force generating mechanism 252 on the piston 242, which comprises the orifice 252a and the disk valve 252b.

During the contraction stroke, the hydraulic fluid in the lower cylinder chamber 240c is pressurized and the resulting hydraulic pressure is transmitted to the inside of the guide 255 through the bore 265a in the partition plate 265, causing the hydraulic fluid in the pressure chamber 255a to flow out into the passage member 256 through the orifice 264a in the partition plate 264, and thus causing the shutter 259 to move toward the partition plate 264.

Figure 27:
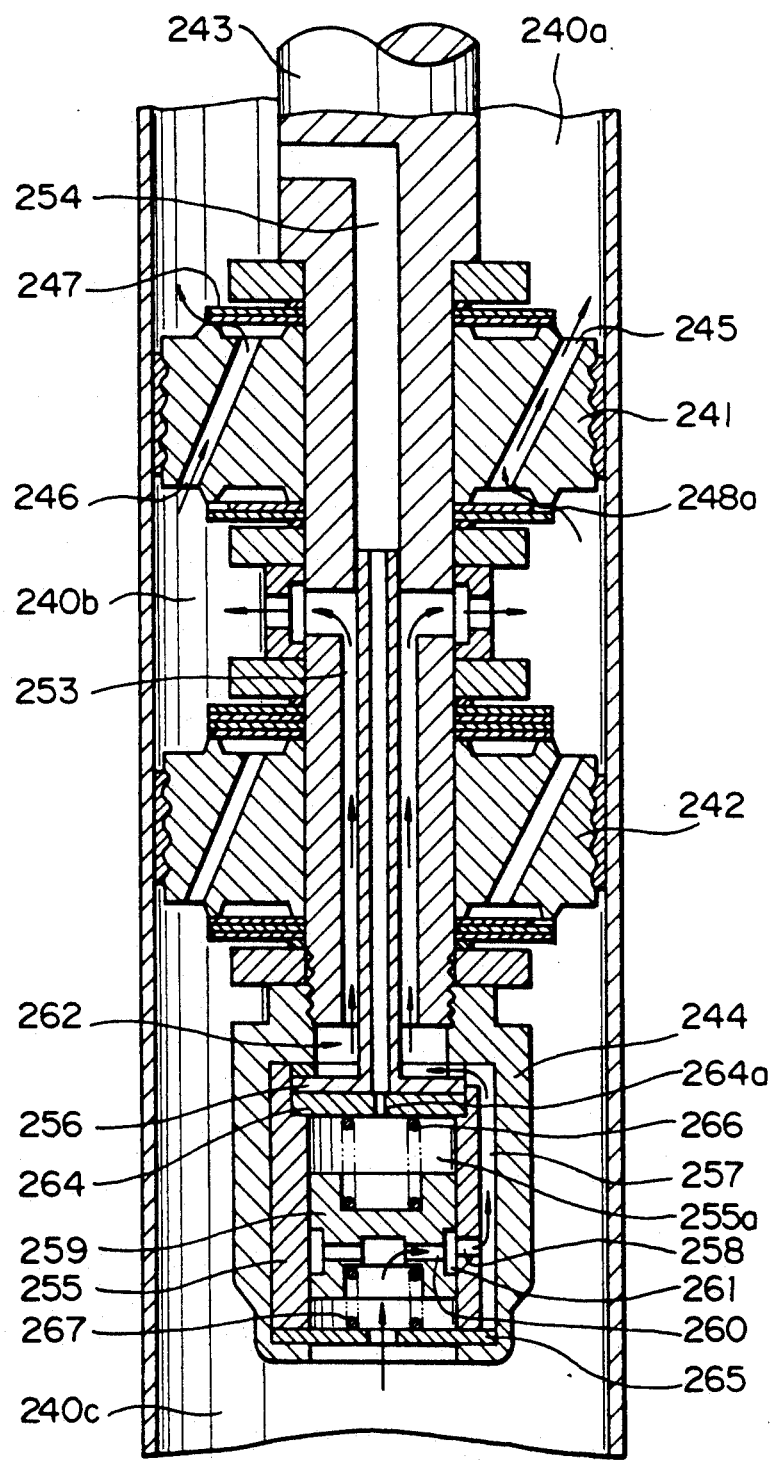
FIG. 27 shows the apparatus shown in FIG. 25 in a state where the orifice passage is opened during the contraction stroke.

When the frequency of vibration of the pistons 241 and 242 is high, the amount of hydraulic fluid flowing out into the passage member 256 from the pressure chamber 255a in the guide 255 through the orifice 264a is small and hence the amount of movement of the shutter 259 is small. Accordingly, the guide and shutter passages 258 and 260 are in communication with each other, so that the hydraulic fluid in the lower cylinder chamber 240c passes through the bypass passage 262 with substantially no resistance to flow into the central cylinder chamber 240b, and the hydraulic fluid in the central cylinder chamber 240b flows into the upper cylinder chamber 240a through the passages 245 and 246 in the piston 241, as shown by the arrows in FIG. 27. Thus, a small damping force is generated by virtue of the orifice and valve characteristics of only the orifice 248a and the damping force generating mechanism 247 of the piston 241.

When the frequency of vibration of the pistons 241 and 242 lowers, the amount of hydraulic fluid flowing out into the passage member 256 from the pressure chamber 255a in the guide 255 through the orifice 264a increases and hence the amount of movement of the shutter 259 increases. Accordingly, the communication between the guide and shutter passages 258 and 260 begins to be cut off, so that the passage area that is determined by the guide and shutter passages 258 and 260 decreases in accordance with the frequency of vibration of the pistons 241 and 242 and the damping force increases in inverse proportion to it.

Figure 28:
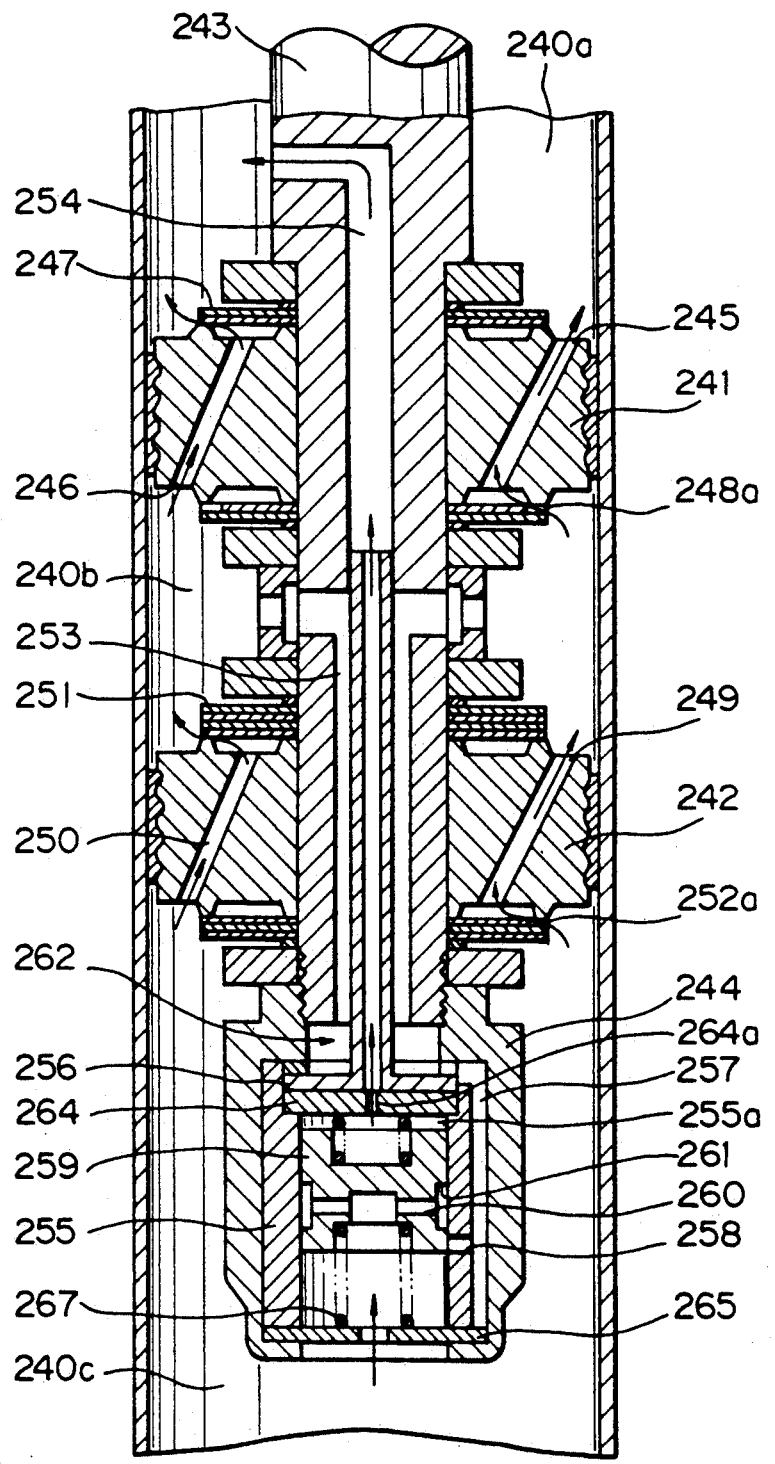
FIG. 28 shows the apparatus shown in FIG. 25 in a state where the orifice passage is closed during the contraction stroke.

When the frequency of vibration of the pistons 241 and 242 further lowers and the communication between the guide and shutter passages 258 and 260 is eventually cut off, the hydraulic fluid in the lower cylinder chamber 240c flows into the central cylinder chamber 240b through the hydraulic fluid passages 249 and 250 in the piston 242 and the hydraulic fluid in the central cylinder chamber 240b flows into the upper cylinder chamber 240a through the passages 245 and 246 in the piston 241, as shown by the arrows in FIG. 28. Accordingly, a large damping force is generated by virtue of the orifice and valve characteristics of the orifice 248a and the damping force generating mechanism 247 of the piston 241 and those of the orifice 252a and the damping force generating mechanism 251 of the piston 242.

Thus, the orifice and valve characteristics can be changed in accordance with the frequency of vibration during the extension and contraction strokes in the same way as in the eighth embodiment.

With regard to the orifice 264a in the partition plate 264, the valve mechanism 224, which has been explained in the eighth embodiment, may be provided between the partition plate 264 and the passage member 256 so as to make a difference in the passage area of the orifice between the extension stroke and the contraction stroke. By so doing, the amount of movement of the shutter 259 can be set independently for the extension stroke and the contraction stroke.

In the hydraulic shock absorbers of the foregoing embodiments arranged as detailed above, the hydraulic fluid is caused to flow in and out of the pressure chamber in the guide by the flow of the hydraulic fluid that is induced by the sliding motion of the piston during the extension and contraction strokes, causing the shutter to slide in either direction, which results in a change in the degree of opening defined between the guide passages provided in the side wall of the guide and the shutter passages.

When the frequency of vibration of the piston is high, the amount of hydraulic fluid flowing in and out of the pressure chamber in the guide is small and hence the amount of movement of the shutter is also small, so that the guide and shutter passages are in communication with each other. Accordingly, the hydraulic fluid circulates through the bypass passage, resulting in small damping force being generated in accordance with the degree of opening of the guide and shutter passages.

When the frequency of vibration of the piston is low, the amount of hydraulic fluid flowing in and out of the pressure chamber in the guide is large and hence the amount of movement of the shutter is large. Accordingly, the communication between the guide and shutter passages is cut off, and the bypass passage is closed, resulting in an increase in the damping force generated.

As a result, the orifice characteristics, or the orifice and valve characteristics, can be changed in accordance with the frequency of vibration during both the extension and contraction strokes, so that it is possible to make the vehicle even more comfortable to ride in and improve the steering stability.

What is claimed is:
1. A hydraulic shock absorber, comprising:
  a cylinder having at least two cylinder chambers defined therein for containing a hydraulic fluid;
  a fluid passageway for communicating said two cylinder chambers with each other;
  a piston disposed in said cylinder such that sliding movement of said piston in said cylinder induces hydraulic fluid flow in said fluid passageway;
  a damping force generating mechanism for generating a damping force restricting the hydraulic fluid flow through said passageway; and
  control means for selectively communicating said two cylinder chambers so as to control the damping force on the hydraulic fluid flowing between said two chambers, said control means comprising:
  a tubular guide having a sidewall and opposite ends, one said end being fluidly connected with one of said two cylinder chambers, and the other said end being fluidly connected with the other of said two cylinder chambers;
  a shutter slidably disposed in said tubular guide for sliding movement in the axial direction of said tubular guide, dividing the interior of said tubular guide into two fluid chambers, and said shutter defining a shutter passage therein;
  orifice means having an orifice for fluidly communicating the one said cylinder chamber with one said fluid chamber of said tubular guide only through said orifice such that said orifice creates resistance to the flow of hydraulic fluid between the one said cylinder chamber and the one said fluid chamber such that the one said fluid chamber forms a pressure chamber;
  passage means for fluidly communicating the other said fluid chamber with the other said cylinder chamber with substantially no resistance to the flow of hydraulic fluid therebetween;
  a bypass passageway for fixedly communicating said two cylinder chambers, said bypass passageway including a guide passage extending through said sidewall of said tubular guide; and
  means for yieldably retaining said shutter in said tubular guide in an intermediate position whereat said shutter passage fluidly communicates with said guide passage in said sidewall of said tubular guide, said bypass passageway thereby being open;
  wherein said shutter further has wall means for blocking said guide passage when said shutter is axially shifted from said intermediate position; and
  wherein said shutter is axially moveable in opposite directions from said intermediate position to block said guide passage with said wall means.

2. The hydraulic shock absorber of claim 1, wherein said shutter passage fluidly communicates said guide passage of said bypass passageway with the other said fluid chamber of said tubular guide when said shutter is in said intermediate position.

3. The hydraulic shock absorber of claim 2, and further comprising a damping force generating valve disposed in said bypass passageway so as to restrict the flow of hydraulic fluid in said bypass passageway and generate a damping force.

4. The hydraulic shock absorber of claim 3, wherein said orifice means varies the flow area of said orifice according to the direction of fluid flow through said orifice.

5. The hydraulic shock absorber of claim 2, wherein said orifice means varies the flow area of said orifice according to the direction of fluid flow through said orifice.

6. The hydraulic shock absorber of claim 1, wherein said orifice means varies the flow area of said orifice according to the direction of fluid flow through said orifice.

7. The hydraulic shock absorber of claim 1, and further comprising a damping force generating valve disposed in said bypass passageway so as to restrict the flow of hydraulic fluid in said bypass passageway and generate a damping force.

* * * * *